US012599929B2

(12) United States Patent
Burmester et al.

(10) Patent No.: US 12,599,929 B2
(45) Date of Patent: Apr. 14, 2026

(54) POWDER SPRAYING SYSTEM, POWDER SPRAYING NOZZLE AND METHOD

(71) Applicant: JOHNSON MATTHEY PUBLIC LIMITED COMPANY, London (GB)

(72) Inventors: Sabina Burmester, Royston (GB); Thomas Hotchkiss, Royston (GB); David Marvell, Royston (GB); Craig Thomson, Royston (GB)

(73) Assignee: Johnson Matthey Public Limited Company, London (GB)

( * ) Notice: Subject to any disclaimer, the term of this patent is extended or adjusted under 35 U.S.C. 154(b) by 416 days.

(21) Appl. No.: 17/649,718

(22) Filed: Feb. 2, 2022

(65) Prior Publication Data

US 2022/0258201 A1 Aug. 18, 2022

Related U.S. Application Data

(60) Provisional application No. 63/200,076, filed on Feb. 12, 2021.

(51) Int. Cl.
*B05D 1/12* (2006.01)
*B05B 7/14* (2006.01)
*B05B 15/40* (2018.01)

(52) U.S. Cl.
CPC .............. *B05D 1/12* (2013.01); *B05B 7/1463* (2013.01); *B05B 15/40* (2018.02)

(58) Field of Classification Search
CPC .......... B05B 15/40; B05B 7/1463; B05D 1/12
USPC ............ 239/79, 85, 418, 421, 423, 424, 654
See application file for complete search history.

(56) References Cited

U.S. PATENT DOCUMENTS

RE20,425 E * 6/1937 Schori ...................... B05B 7/144 239/85
3,313,908 A 4/1967 Unger
3,438,579 A 4/1969 Wiese
3,514,036 A 5/1970 Smith, Sr.
(Continued)

FOREIGN PATENT DOCUMENTS

CN 1593781 A 3/2005
CN 103717314 A 4/2014
(Continued)

*Primary Examiner* — Steven J Ganey
(74) *Attorney, Agent, or Firm* — BakerHostetler

(57) ABSTRACT

A powder spraying system comprises a source of dry powder (4), a spray nozzle (25), and a supply conduit (16) connecting the source of dry powder with the spray nozzle. The spray nozzle comprises a nozzle body (50) having a nozzle outlet (51), a first conduit (52) for dry powder, and a second conduit (53) for gas. The first conduit extends between a powder inlet (54) in communication with the supply conduit and a powder outlet (55). The second conduit extends between a gas inlet (56) and a gas outlet (57), the gas outlet being located in proximity to the powder outlet such that a gas flowing through the second conduit and out of the gas outlet produces a suction force at the powder outlet to promote flow of a dry powder through the first conduit and out of the powder outlet and the nozzle outlet. The powder outlet and the gas outlet are orientated to promote mixing of the gas with the dry powder. The first conduit (52) is a straight conduit between the powder inlet (54) and the powder outlet (55).

18 Claims, 14 Drawing Sheets

(56) References Cited

U.S. PATENT DOCUMENTS

| | | | | | |
|---|---|---|---|---|---|
| 4,065,057 | A * | 12/1977 | Durmann | B05B 7/1626 239/79 |
| 4,103,827 | A | 8/1978 | Kumazawa | |
| 4,600,603 | A | 7/1986 | Mulder | |
| 5,230,470 | A | 7/1993 | Rajan et al. | |
| 5,297,733 | A | 3/1994 | Burks et al. | |
| 5,486,676 | A * | 1/1996 | Aleshin | B23K 26/144 239/79 |
| 5,520,735 | A | 5/1996 | Mulder | |
| 5,873,680 | A | 2/1999 | Huber et al. | |
| 6,631,612 | B1 | 10/2003 | Toshihiko | |
| 6,881,919 | B2 * | 4/2005 | Pyritz | B23K 26/144 219/76.1 |
| 7,621,466 | B2 * | 11/2009 | Ko | C23C 24/04 239/398 |
| 8,245,958 | B2 * | 8/2012 | Ko | B05B 11/06 239/650 |
| 9,358,561 | B2 | 6/2016 | Johnson | |
| 2010/0043700 | A1 | 2/2010 | Trefz | |
| 2011/0229634 | A1 | 9/2011 | Tsuji | |
| 2012/0222649 | A1 | 9/2012 | Kudoh | |
| 2021/0047952 | A1 | 2/2021 | Burmester et al. | |

FOREIGN PATENT DOCUMENTS

| | | | |
|---|---|---|---|
| CN | 109562237 | A | 4/2019 |
| DE | 10248459 | A1 | 5/2004 |
| GB | 1 028 004 | A | 5/1966 |
| JP | H06154695 | A | 6/1994 |
| JP | H10141299 | A | 5/1998 |
| JP | 2012157855 | A | 8/2012 |
| KR | 20010067095 | A | 7/2001 |
| KR | 101562216 | B1 | 10/2015 |
| KR | 101723487 | | 2/2021 |
| WO | 2017180151 | A1 | 10/2017 |

* cited by examiner

POWDER SPRAYING SYSTEM, POWDER SPRAYING NOZZLE AND METHOD

The present disclosure relates to a powder spraying system and a powder spraying nozzle. In particular, the disclosure relates to a powder spraying system and a powder spraying nozzle that may be used as part of an apparatus for, and in a method of, coating a filter comprising a porous substrate having inlet surfaces and outlet surfaces, wherein the inlet surfaces are separated from the outlet surfaces by a porous structure. The filter may be a wall-flow filter, for example for an emissions control device of an internal combustion engine.

BACKGROUND TO THE DISCLOSURE

There are concerns about emissions of particulate matter (PM), commonly referred to as soot, from internal combustion engines and especially from diesel and gasoline engines in automotive applications. The main concerns are associated with potential health effects, and, in particular, with very tiny particles having sizes in the nanometer range.

Diesel particulate filters (DPFs) and gasoline particulate filters (GPFs) have been fabricated using a variety of materials including sintered metal, ceramic or metal fibres etc., with the most common type in actual mass production being the wall-flow kind made from porous ceramic material fabricated in the form of a monolithic array of many small channels running along the length of the body. Alternate channels are plugged at one end, so the exhaust gas is forced through the porous ceramic channel walls that prevent most of the particulate from passing through so only filtered gas enters the environment. Ceramic wall-flow filters in commercial production include those made from cordierite, various forms of silicon carbide and aluminium titanate. The actual shape and dimensions of practical filters on vehicles as well as properties such as the channel wall thickness and its porosity etc. depend on the application concerned. The average dimensions of the pores in the filter channel walls of a ceramic wall-flow filter through which the gas passes are typically in the range 5 to 50 μm and usually about 20 μm. In marked contrast, the size of most diesel particulate matter from a modern passenger car high speed diesel engine is very much smaller, e.g. 10 to 200 nm.

Some PM may be retained within the pore structure in the filter walls and this may in some applications gradually build up until the pores are bridged over by a network of PM and this PM network then enables the easy formation of a cake of particulate on the internal walls of the filter channels. The particulate cake is an excellent filter medium and its presence affords very high filtration efficiency. In some applications soot is burned continuously on the filter as it is deposited which prevents a particulate cake from building up on the filter.

For some filters, for example light duty diesel particulate filters, it is periodically necessary to remove trapped PM from the filter to prevent the build-up of excessive back pressure that is detrimental to engine performance and can cause poor fuel economy. So, in diesel applications, retained PM is removed from the filter by burning it in air in a process during which the amount of air available and the amount of excess fuel used to achieve the high temperature needed to ignite the retained PM are very carefully controlled. Towards the end of this process, that is usually called regeneration, the removal of the last remaining particulate in the filter can lead to a marked decrease in filtration efficiency and release of a burst of many small particles into the environment. Thus, filters may have low filtration efficiency when they are first used and subsequently after each regeneration event and also during the latter part of each regeneration process.

Thus, it would be desirable to improve and or maintain filtration efficiency at all times—for example during the early life of a filter when it is first used, and or during regeneration and immediately afterwards, and or when the filter is loaded with soot.

Liu, X., Szente, J., Pakko, J., Lambert, C. et al., "Using Artificial Ash to Improve GPF Performance at Zero Mileage," SAE Technical Paper 2019-01-0974, 2019, doi: 10.4271/2019-01-0974 describes a process for loading a bare filter substrate with submicron alumina particles generated by an atomizer to fabricate an "artificial ash" coating to reduce soot emission during cold start conditions. The process consists of generating aerosol particles by atomizing a liquid suspension with compressed air, drying the resulting ash containing droplets by flowing them through an oven, and loading the dried ash particles into the filter via their capture by filtration. The process utilises a high capacity atomizer (model PLG-2100, PALAS, Germany) to provide 100 l/min flow rate for full size bricks. Loading of the filter is monitored by the pressure drop across the filter and PM concentration before and after the filter recorded by a DustTrak aerosol monitor (TSI Inc, Minnesota, USA). While said process shows a reduction in soot emissions during cold start conditions, it is limited to substances that can be spray dried, requires an atomizer, drying oven and aerosol monitor and the artificial ash loading conditions may be constrained by the conditions necessary to achieve complete drying of the liquid aerosol before it reaches the filter substrate.

WO2011/151711 describes a method of making a filter for filtering particulate matter from exhaust gas emitted from a lean-burn internal combustion engine. The filter comprises a porous substrate having inlet surfaces and outlet surfaces, wherein the inlet surfaces are separated from the outlet surfaces by a porous structure containing pores of a first mean pore size. The inlet surfaces comprise a bridge network comprising interconnected particles of refractory material over the pores of the porous structure. The method comprises the step of contacting inlet surfaces of the filter substrate with an aerosol comprising refractory material in dry powder form. While said process shows a reduction in PM emissions for filters when first used and subsequently after each regeneration event, it would be desirable to provide an improved process, in particular, with respect to the controllability of the parameters of the filter produced.

US2019/0048771 describes engine exhaust particulate filters including a porous substrate having thereon inert nanoparticles at a concentration ranging from 0.01 g/L to 60 g/L relative to a filter volume of the substrate, a portion of the nanoparticles arranged to form regeneration resistant porous structures configured to capture particulates from an exhaust gas stream. While said filters purport to provide an improvement in the zero-mileage efficiency of particulate filters it would be desirable to provide an improved process, in particular, to improve controllability and flexibility of the process.

The present applicant has discovered (as described fully in their application GB1911704 filed 15 Aug. 2019, which is hereby incorporated by reference in its entirety) that a filter having improved filtration efficiency during the early life of the filter when it is first used, and or during regeneration and immediately afterwards, and or when the filter is loaded with soot may be obtained by a method of treatment that comprises the steps of:

a) containing a dry powder in a reservoir;

b) locating a filter in a filter holder, the filter comprising a porous substrate having an inlet face and an outlet face, the inlet face and the outlet face being separated by a porous structure;

c) establishing a primary gas flow through the porous structure of the filter by applying a pressure reduction to the outlet face of the filter;

d) transferring the dry powder from the reservoir to a spray device located upstream of the inlet face of the filter; and e) spraying the dry powder, using the spray device, towards the inlet face of the filter such that the dry powder is entrained in the primary gas flow and passes through the inlet face of the filter to contact the porous structure.

In GB1911704 the present applicant describes how the dry powder may optionally comprise one or more of fumed alumina, fumed silica, fumed titania, silica aerogel, alumina aerogel, carbon aerogel, titania aerogel, zirconia aerogel or ceria aerogel. In particular, examples of filters are described which have been coated with a fumed aluminium oxide having a tapped density of 0.05 g/l and d50 of 5.97 microns.

While this method of treatment has been found to produce filters with improved filtration efficiency characteristics there is still a desire to further improve the treatment of such filters, in particular, to improve the durability of the treated filters.

Consequently, the present applicant has discovered (as described fully in their application GB2002483 filed 21 Feb. 2020, which is hereby incorporated by reference in its entirety) that the durability of the treated filters may be improved by using a dry powder in the spraying process that comprises or consists of a metal compound for forming by thermal decomposition a metal oxide.

In GB2002483 the present applicant describes how it has been that the use of a metal compound that decomposes thermally into a metal oxide as the dry powder may produce substantial improvements in the durability of the treated filter compared to treatment with metal oxides including, for example, fumed aluminium oxide, especially in the ability of the dry powder to remain adhered to the porous structure and resist being de-adhered from the porous structure during subsequent operation of the filter.

Surprisingly, the present applicant has discovered that improved adhesion of these dry powders may be achieved without the presence of any additional binder or adhesion promotor or the need for any high-temperature sintering of the filter. In particular, it has been surprisingly found that the use of such dry powders may result in good adhesion while maintaining high filtration efficiencies and with acceptable cold flow back pressures.

While the methods of treatment of GB1911704 and GB2002483 have been found to be effective in producing improved filters there is still a desire to improve the methods, in particular in the handling and spraying of the dry powders.

SUMMARY OF THE DISCLOSURE

In a first aspect the present disclosure provides a powder spraying system comprising:

a) a source of dry powder;

b) a spray nozzle; and c) a supply conduit connecting the source of dry powder with the spray nozzle;

wherein the spray nozzle comprises:

i) a nozzle body having a nozzle outlet;

ii) a first conduit for dry powder; and iii) a second conduit for gas;

the first conduit extending between a powder inlet in communication with the supply conduit and a powder outlet;

the second conduit extending between a gas inlet and a gas outlet, the gas outlet being located in proximity to the powder outlet such that a gas flowing through the second conduit and out of the gas outlet produces a suction force at the powder outlet to promote flow of a dry powder through the first conduit and out of the powder outlet and the nozzle outlet;

the powder outlet and the gas outlet being orientated to promote mixing of the gas with the dry powder.

Beneficially, the powder spraying system may provide improved handling and spraying of dry powders. For example, the use of the described spray nozzle may allow for more reliable and precise control of the spray angle of the dry powder. In addition, the provision of a suction force at the powder outlet may improve the dispersion and mixing of the particles of the dry powder in a carrier gas into which the dry powder is sprayed. For example, the spray nozzle may impart increased shear forces and/or an increased pressure drop on the dry powder as it passes through the spray nozzle. This may beneficially act to de-agglomerate the dry powder, for example where the particles of the dry powder have a tendency to form cohesive agglomerates.

Additionally, the provision of a suction force at the powder outlet to promote flow of the dry powder through the first conduit and out of the powder outlet and the nozzle outlet may beneficially help to enable the feeding of the dry powder into the spray nozzle by gravity. In the system of GB1911704 the feeding of the dry powder from, for example, an upstream hopper to the spray nozzle was carried out by fluidising and entraining the dry powder in a gas stream (e.g. compressed air) and conveying the mixture of the gas and dry powder along one or more conduits to the spray nozzle. However, this has been found to have some potential drawbacks in some situations. For example, the energy of the gas stream conveying the dry powder to the spray nozzle tends to be high, leading to the dry powder being expelled from the spray nozzle with a relatively high energy. The dry powder exiting the spray nozzle may also not be mixed very homogenously with the gas stream, an issue that may be particularly prevalent when the gas:dry powder ratio of the mixture is high. Additionally, a relatively high velocity of the mixture of air and dry powder is high when it reaches the filter may result in the dry powder travelling preferentially to the bottom portion of the channels of the filter resulting in a less even distribution of the dry powder along the walls of the channels.

The powder spraying system of the present disclosure may mitigate or overcome this problem by using a suction force at the powder outlet to promote flow of the dry powder through the first conduit and out of the powder outlet and the nozzle outlet. This means that the spray nozzle does not require to be fed with a mixture of gas (e.g. compressed air) and dry powder in order to convey the dry powder to and through the spray nozzle. Rather, the spray nozzle may be fed with the dry powder from the source of dry powder (or at least the part of the source of dry powder that communicates with the supply conduit) through the supply conduit without the use of a gas stream, e.g. the dry powder does not need to be entrained in a gas stream as is passes along the supply conduit but rather moves along the supply conduit under the action of gravity assisted by the suction force generated in the spray nozzle. This may permit the flow of the dry powder to be more precisely controlled and the dispersion of the dry powder into the carrier gas to be more homogenous. Additionally, the dry powder may be sprayed less energetically towards the inlet face of the filter.

It should be noted that where the source of the dry powder comprises multiple parts, e.g. multiple hoppers or storage locations with interconnecting conduits, a flow of gas may be used to entrain and mobilise the dry powder as it is moved from one part of the source of dry powder to another part of the source of dry powder. However, in accordance with the present disclosure, the feeding of the supply conduit from a terminal part of the source of dry powder, e.g. the hopper or storage location immediately upstream of the supply conduit, is carried out by gravity assisted by the suction force generated in the spray nozzle and without the use of a gas flow in the supply conduit to entrain the dry powder.

In a second aspect the present disclosure provides a powder spray nozzle comprising:

i) a nozzle body having a nozzle outlet;
ii) a first conduit for dry powder; and
iii) a second conduit for gas;

the first conduit extending between a powder inlet in communication with the supply conduit and a powder outlet;

the second conduit extending between a gas inlet and a gas outlet, the gas outlet being located in proximity to the powder outlet such that a gas flowing through the second conduit and out of the gas outlet produces a suction force at the powder outlet to promote flow of a dry powder through the first conduit and out of the powder outlet and the nozzle outlet;

wherein the first conduit is a straight conduit between the powder inlet and the powder outlet.

Beneficially, use of a straight conduit between the powder inlet and the powder outlet may help to improve powder flow and significantly reduce the chance of blockages. For example, the arrangement may reduce or preferably eliminate the occurrence of stagnant areas where the dry powder could build-up. This may be a particular benefit where the spray nozzle is for use in a system as described in the first aspect above, wherein the dry powder is fed to the powder inlet of the first conduit without the use of a gas stream, e.g. by gravity assisted by the suction force generated in the spray nozzle. In such systems it may be particularly important to reduce or remove any surfaces that might act as accumulation sites for powder build-up.

In addition, the first conduit being straight may beneficially increase the velocity of the dry powder passing through the first conduit which may reduce the tendency for the dry powder to settle and build-up on internal surfaces of the spray nozzle. Further, the use of a straight first conduit as part of the powder spray nozzle that produces a suction force at the powder outlet may be particularly beneficial for dry powders that do not easily flow through conduits, since in this case the use of suction and fluidisation inside the nozzle assists in flow of the dry powder.

The powder spraying system and the powder spray nozzle may find particular application when used in a method of treatment of a filter. The filter may, for example, be a wall-flow filter, for example for an emissions control device of an internal combustion engine. Examples of such filters include, but are not limited to diesel particulate filters (DPFs) and gasoline particulate filters (GPFs). The method of treatment may comprise the steps of:

a) containing the dry powder in the source of dry powder, for example in a reservoir;
b) locating a filter in a filter holder, the filter comprising a porous substrate having an inlet face and an outlet face, the inlet face and the outlet face being separated by a porous structure;
c) establishing a primary gas flow through the porous structure of the filter by applying a pressure reduction to the outlet face of the filter;
d) transferring the dry powder from the source of dry powder through the supply conduit to the spray nozzle that is located upstream of the inlet face of the filter; and
e) spraying the dry powder, using the spray nozzle, towards the inlet face of the filter such that the dry powder is entrained in the primary gas flow and passes through the inlet face of the filter to contact the porous structure.

In a third aspect the present disclosure provides a method for treating a filter for filtering particulate matter from exhaust gas, the method comprising the steps of:

a) containing a dry powder in a reservoir;
b) locating a filter in a filter holder, the filter comprising a porous substrate having an inlet face and an outlet face, the inlet face and the outlet face being separated by a porous structure;
c) establishing a primary gas flow through the porous structure of the filter by applying a pressure reduction to the outlet face of the filter;
d) transferring the dry powder from the reservoir through a supply conduit and to a spray device located upstream of the inlet face of the filter; and
e) spraying the dry powder, using the spray device, towards the inlet face of the filter such that the dry powder is entrained in the primary gas flow and passes through the inlet face of the filter to contact the porous structure;

wherein the dry powder is transferred through the supply conduit to the spray device by gravity and/or by a suction force generated within the spray device.

Beneficially the dry powder may be transferred through the supply conduit to the spray device only by gravity and/or by a suction force generated within the spray device. Optionally, the reservoir may comprise a hopper directly feeding the supply conduit and the dry powder may be dosed into said hopper. The dosing may be a gravimetric dosing of the dry powder.

The spray device may comprise a spray nozzle (for example the powder spray nozzle of the second aspect) that may be supplied with a flow of pressurised gas along a conduit that is separate from the supply conduit, the flow of pressurised gas being used in the spray nozzle to generate the suction force.

The powder spraying system of the first aspect may additionally comprises one or more of the following features:

The source of dry powder may be aligned with the first conduit of the nozzle body, optionally wherein the source of dry powder may be coincident with a longitudinal axis of the first conduit. The source of dry powder may comprise one or more hoppers.

The supply conduit between the source of dry powder and the spray nozzle may be straight.

The supply conduit between the source of dry powder and the spray nozzle may have an internal diameter of 1 to 20 mm, optionally 5 to 10 mm.

The spray nozzle may be orientated such that the nozzle outlet faces downwards and the source of dry powder is located directly above the spray nozzle.

When the powder spraying system is used in the method of treatment of a filter, the filter may be located in a holder in a vertical orientation with the inlet face of the filter uppermost. The spray nozzle may be located vertically above the inlet face; and optionally a spray direction of the spray nozzle may be co-axial with a longitudinal axis of the filter; and optionally the spray direction and the longitudinal axis are coincident. Beneficially this arrangement may provide a more simplified process and better dispersion of the dry powder and may beneficially not leave any residual dry powder in the conduit feeding the powder spray nozzle.

The powder spraying system may further comprise a dosing device for dosing the dry powder from the source of dry powder. The dosing device may dose the dry powder directly into the supply conduit or into a hopper that directly feeds the supply conduit. The dosing device may dose by one or more of by weight, by volume, by particle number, by time. The dosing device may be a loss in weight feeder. Beneficially the use of a dosing device, optionally a gravimetrically fed dosing device may provide a more controllable and accurate dosing of the dry powder.

Any of the above aspects may additionally comprise one or more of the following features:

The powder outlet may be located within the nozzle body upstream of the nozzle outlet such that an initial mixing of the gas with the dry powder occurs within an interior of the nozzle body upstream of the nozzle outlet. The gas outlet may be located within the nozzle body upstream of the nozzle outlet.

Alternatively, the powder outlet may be located at or near the nozzle outlet of the nozzle body such that an initial mixing of the gas with the dry powder occurs outside of the nozzle body. In this case the gas outlet may be located at or near the nozzle outlet of the nozzle body.

The gas outlet may comprise an annular outlet that surrounds the powder outlet.

The powder outlet may be centrally located on a longitudinal axis of the nozzle body.

In some examples the powder outlet may comprise a single powder aperture. In other examples the powder outlet may comprise a plurality of powder apertures, each powder aperture being associated with the gas outlet of the second conduit. At least one of the plurality of powder apertures may be orientated along a longitudinal axis of the nozzle body. At least one of the plurality of powder apertures may be orientated at a divergent angle to a longitudinal axis of the nozzle body. The or each powder aperture may have an orifice diameter of 0.5 to 5.0 mm, optionally 1.0 to 2.5 mm, optionally 1.0 to 2.0 mm. These orifice sizes may lead to good dispersion of the dry powder.

The gas outlet may comprise an annular aperture that surrounds the or each associated powder aperture. The annular aperture may have a width of 0.2 to 2.0 mm, optionally 0.2 to 1.0 mm, optionally 0.25 to 0.9 mm, optionally 0.6 mm.

The nozzle outlet may be located in a first end face of the nozzle body and the powder inlet may be located in an opposite, second end face of the nozzle body.

The first conduit may be a straight conduit between the powder inlet and the powder outlet.

The first conduit may be parallel to, and optionally coincident with, a longitudinal axis of the nozzle body.

The first conduit may comprise a bore whose internal diameter decreases from a first diameter at the powder inlet to a second diameter at or adjacent the powder outlet.

The first conduit may comprise a bore whose internal diameter smoothly decreases from a first diameter at the powder inlet to a second diameter at or adjacent the powder outlet.

The first conduit may comprise a bore whose internal diameter decreases from a first diameter at the powder inlet to a second diameter at or adjacent the powder outlet exclusively via one or more tapered sections.

The nozzle body may comprise one or more secondary gas outlets that are spaced from the nozzle outlet and are orientated to direct one or more secondary flows of gas to impinge on the flow of gas and dry powder exiting the nozzle outlet, the impingement being exterior the nozzle body and at a distance from, the nozzle outlet.

The one or more secondary gas outlets may be orientated to direct the one or more secondary flows of gas such that their angle of incidence with the flow of gas and dry powder exiting the nozzle outlet is 30 to 90°, optionally 45 to 75°, optionally 60°.

The one or more secondary gas outlets may comprise 2, 4, 6, 8 or more secondary gas outlets; and optionally the one or more secondary gas outlets may form 1, 2, 3, 4 or more pairs of secondary gas outlets, wherein each pair of secondary gas outlets may comprise two secondary gas outlets that are located on opposite sides of the nozzle outlet from each other.

Each of the secondary gas outlets may have an orifice diameter of 0.5 to 2.5 mm, optionally 1.0 to 2.5 mm.

The one or more secondary gas outlets may be provided in one or more legs that project from a face of the nozzle body that comprises the nozzle outlet such that the one or more secondary gas outlets are located axially downstream of the nozzle outlet; and optionally the one or more secondary gas outlets may be located 2 to 20 mm, optionally 8 to 15 mm axially downstream of the nozzle outlet.

The nozzle body may comprise a third conduit, separate from the second conduit, for supplying gas to the secondary gas outlets.

The nozzle body may comprise a tubular element defining at least the powder outlet of the first conduit and a cap element, wherein a clearance between the tubular element and the cap element defines the gas outlet.

The clearance between the tubular element and the cap element may be 0.2 to 2.0 mm, optionally 0.2 to 1.0 mm, optionally 0.25 to 0.9 mm, optionally 0.6 mm.

The spray nozzle may further comprise a clean out nozzle located within the first conduit, the clean out nozzle being connected to a supply of gas and having an outlet orientated towards the powder outlet. The outlet of the clean out nozzle may be located 2 to 50 mm, optionally 4 to 25 mm from the powder outlet. The outlet may comprise a single orifice or multiple orifices. The outlet may comprise 1 to 10, optionally 1 to 3 orifices. The or each orifice may have an orifice diameter of 0.5 to 1.5 mm, optionally 0.5 mm.

Beneficially the clean out nozzle may be used to reduce the chance of blockage of the powder outlet. For example a compressed gas flow may be jetted out of the outlet at an interior face of the powder outlet to break up and dislodge any build-up of the dry powder in the region of the powder outlet.

The clean out nozzle may be configured to produce a suction force within the first conduit to promote flow of a dry powder through the first conduit. The clean out nozzle may be configured to fluidise dry powder within the first conduit.

The clean out nozzle may comprise an elongate tubular element located within the first conduit to define an annular flow space for the dry powder between an external wall of the clean out nozzle and an internal wall of the first conduit.

The source of dry powder may comprise a source of a first dry powder and a source of a second dry powder, and wherein the first conduit may comprise a first powder inlet in communication with the source of the first dry powder and a second powder inlet in communication with the source of the second dry powder; wherein the gas flowing through the second conduit and out of the gas outlet produces a suction force at the powder outlet to promote flow of the first dry powder and the second dry powder through the first conduit and out of the powder outlet and the nozzle outlet.

The first conduit may comprise a first flow path for the first dry powder along at least a portion of its length and a second flow path for the second dry powder along at least a portion of its length, the first flow path and the second flow path being separate from one another; and optionally wherein the first flow path and the second flow path may comprise concentrically-arranged flow paths.

The powder spraying system or the powder spray nozzle as described above may be incorporated as part of an apparatus for treating a filter for filtering particulate matter from exhaust gas. The apparatus may further comprise a filter holder for holding a filter, wherein the nozzle outlet of the powder spray nozzle is orientated to spray the dry powder towards an inlet face of the filter. The apparatus may further comprise a vacuum generator in communication with an outlet face of the filter for generating a primary flow of gas through the filter, wherein the powder spray nozzle is located upstream of the inlet face of the filter and is orientated to spray the dry powder into the primary flow of gas upstream of the inlet face of the filter. The apparatus may further comprise a flow conduit upstream of the inlet face for channelling the primary flow of gas towards the inlet face of the filter; and an adapter located between the flow conduit and the filter; the adapter being configured to adapt the shape and/or size of the flow conduit to the shape and/or size of the inlet face of the filter.

The adapter may comprise a tubular body provided with an upper seal at its upper end and a lower seal at its lower end; and wherein the upper end of the adapter may have a first internal diameter adapted to an internal diameter of the lower end of the flow conduit and the lower end of the adapter may have a second internal diameter adapted to a diameter of the inlet face of the filter; and optionally wherein the first internal diameter of the adapter may be greater or less than the second internal diameter.

The dry powder sprayed by the powder spray nozzle and in the powder spraying system as described above may comprise or consist of one or more refractory powders, optionally comprising one or more fumed refractory powders, and or one or more aerogels. The one or more fumed refractory powders may be produced by a pyrogenic process, for example flame pyrolysis. The one or more fumed refractory powders may comprise one or more of fumed alumina, fumed silica, fumed titania, other fumed metal oxide and fumed mixed oxides. The one or more aerogels may comprises one or more of silica aerogel, alumina aerogel, carbon aerogel, titania aerogel, zirconia aerogel, ceria aerogel, a metal oxide aerogel and mixed oxide aerogels.

In these examples the dry powder may have a tapped density of less than 0.10 g/cm$^3$, optionally less than 0.08 g/cm$^3$, optionally less than 0.07 g/cm$^3$, optionally less than 0.06 g/cm$^3$, optionally less than 0.05 g/cm$^3$. The dry powder may have a d50 (by volume) less than 25 microns, optionally less than 20 microns, optionally less than 10 microns.

The dry powder sprayed by the powder spray nozzle and in the powder spraying system may alternatively comprise or consist of a metal compound for forming by thermal decomposition a metal oxide. The dry powder may consist of a single metal compound of may consist of a mixture or blend or successive doses of two or more metal compounds. The or each metal compound may contain one or more metal cations. Where a plurality of metal cations is present these may be of the same or of different metals. The metal compound may comprise or consist of a metal hydroxide, a metal phosphate, a metal carbonate, a metal sulphate, a metal perchlorate, a metal iodide, a metal oxalate, a metal acetate, a metal chlorate or a mixture thereof. The metal of the metal compound may comprise or consist of one or more of magnesium, calcium, strontium, barium, aluminium, zirconium, manganese, lithium, iron, cobalt, nickel, copper, or gallium. The dry powder may additionally comprise a metal oxide or mixed metal oxide. Optionally the dry powder comprises 90 wt % or greater of the metal compound for forming by thermal decomposition a metal oxide and 10 wt % or less of the metal oxide or mixed metal oxide. Optionally the dry powder comprises 95 wt % or greater of the metal compound for forming by thermal decomposition a metal oxide and 5 wt % or less of the metal oxide or mixed metal oxide. Optionally the dry powder comprises 99 wt % or greater of the metal compound for forming by thermal decomposition a metal oxide and 1 wt % or less of the metal oxide or mixed metal oxide. The metal of the metal oxide or mixed metal oxide may comprise or consist of one or more of aluminium, magnesium, calcium, strontium, barium, aluminium, zirconium, manganese, lithium, iron, cobalt, nickel, copper, or gallium. Optionally the dry powder comprises or consists of a metal hydroxide, a metal phosphate, a metal carbonate or a mixture thereof. The metal hydroxide may be selected from the group consisting of magnesium hydroxide, calcium hydroxide, strontium hydroxide and barium hydroxide. The metal phosphate may be selected from the group consisting of magnesium phosphate, calcium phosphate, strontium phosphate and barium phosphate. The metal carbonate may be selected from the group consisting of magnesium carbonate, calcium carbonate, strontium carbonate and barium carbonate.

In these examples the dry powder may have a tapped density of 1 to 3 g/cm$^3$, optionally 1.5 to 2.5 g/cm$^3$, optionally about 2 g/cm$^3$. The dry powder may have a d50 (by volume) less than 10 microns, optionally less than 5 microns, optionally about 2 microns.

The dry powder may consist of a single powder type or a mixture of powder types.

When the powder spraying system is used in the method of treatment of a filter, the transfer of the dry powder from the source of dry powder to the spray nozzle may be controlled independently of establishing and controlling the primary gas flow; and optionally the spraying of the dry powder towards the inlet face of the filter may be controlled independently of establishing and controlling the primary gas flow. Beneficially by controlling the transfer and/or spraying of the dry powder from the source of dry powder to the spray nozzle independently of controlling the establishing and controlling of the primary gas flow, a more controllable process may be achieved. For example, the gas flow speed and/or volumetric flow rate of the primary gas flow may be altered without altering the transfer rate and/or speed and/or spray velocity of the dry powder from the spray nozzle. This is in contrast to a method where the primary gas flow through the filter is also used to fluidize a dry powder.

Optionally the primary gas flow is established before the dry powder is transferred to the spray nozzle and sprayed towards the inlet face. Beneficially this may allow a more uniform gas flow to be established through the porous structure before the start of spraying of the dry powder. In turn, this may achieve a better dispersion of the dry powder into and through the porous structure.

Optionally the gas flow through the second conduit of the spray nozzle is separate to the primary gas flow and may be controlled independently of the primary gas flow. Beneficially by controlling the primary gas flow independently of controlling the gas flow through the spray nozzle, a more controllable process may be achieved. For example the volumetric flow rate of the gas flow through the spray nozzle may be chosen to optimise the spray characteristics of the dry powder at one or more outlets of the spray nozzle and separately the volumetric flow rate of the primary gas flow can be chosen to optimise deposition of the dry powder in the porous structure of the filter.

The gas flow through the second conduit of the spray nozzle may comprise a flow of compressed gas, optionally air.

When the powder spraying system is used in the method of treatment of a filter, the powder spraying system may further comprise a flow conduit for channelling the dry powder that exits the nozzle outlet of the spray nozzle towards the inlet face of the filter.

The flow conduit may provide an unimpeded flow path between the spray nozzle and the inlet face of the filter.

Alternatively, the flow conduit may comprise a flow conditioner interposed between the spray nozzle and the inlet face of the filter, the flow conditioner acting to promote dispersion of the dry powder within the gas flow. The flow conditioner may comprise one or more of a static mixer, mesh, a sieve, a baffle, and an orificed plate.

The inlet face of the filter may be located greater than 10 cm, optionally greater than 20 cm from the nozzle outlet of the spray nozzle. Particular benefit may be found when the inlet face of the filter is located greater than 75 cm, optionally greater than 100 cm from the nozzle outlet of the spray nozzle. Beneficially, such spacing may increase the percentage area of the inlet face of the filter receiving the dry powder leading to improved homogeneity of dry powder application to the filter. Additionally, or alternatively the outlet nozzle of the spray nozzle may be located at a distance from the inlet face of the filter that is up to 4 times a diameter of the inlet face of the filter.

In this specification the term "filter" refers to a porous substrate that has a porous structure suitable for filtering particulate matter from exhaust gas. The porous substrate may be formed for example from sintered metal, ceramic or metal fibres etc. The filter may be of the wall-flow kind made from porous material, for example ceramic, fabricated in the form of a monolithic array of many small channels running along the length of the body. For example, the filter may be formed from cordierite, various forms of silicon carbide or aluminium titanate.

The filter may be a "bare" filter or alternatively may be one with an incorporated catalytic function ability such as oxidation, NOx-trapping, or selective catalytic reduction activity. The porous substrate may comprise a composition (known as a washcoat) that coats the porous structure of the filter. The washcoat may be a catalytic washcoat. The catalytic washcoat may comprise a catalyst, selected from the group consisting of a hydrocarbon trap, a three-way catalyst (TWC), a NOx absorber, an oxidation catalyst, a selective catalytic reduction (SCR) catalyst, a lean NOx catalyst and combinations of any two or more thereof. The catalyst, for example the TWC, NOx absorber, oxidation catalyst, hydrocarbon trap and the lean NOx catalyst, may contain one or more platinum group metals, particularly those selected from the group consisting of platinum, palladium and rhodium.

Consequently, the coated filter may, for example, be a catalysed soot filter (CSF), a selective catalytic reduction filter (SCRF), a lean NOx trap filter (LNTF), a gasoline particulate filter (GPF), an ammonia slip catalyst filter (ASCF) or a combination of two or more thereof (e.g. a filter comprising a selective catalytic reduction (SCR) catalyst and an ammonia slip catalyst (ASC).

The shape and dimensions of the filter, for example properties such as the channel wall thickness and its porosity etc. may be varied depending on the intended application for the filter. The filter may be configured for use with an internal combustion engine to filter the exhaust gas emitted by the internal combustion engine. The internal combustion engine may be a gasoline spark ignition engine. However, the filter finds particular application when configured for use with an internal combustion engine in the form of a diesel or gasoline engine.

In this specification the term "dry powder" refers to a particulate composition that is not suspended or dissolved in a liquid. It is not meant to necessarily imply a complete absence of all water molecules. The dry powder is optionally free flowing.

In this specification the term "tapped density" refers to the tapped density of the powder as measured according to Method 1 of Section 2.9.35 of European Pharmacopoeia 7.0 with 1250 taps.

In this specification the term "g/l" (grams per litre) refers to the mass of dry powder divided by the volume of the filter.

In this specification the terms "loading" and "mass loading" when referencing the quantity of dry powder, refer to the mass of powder added to a filter and may be measured by weighing the filter before and after application of the powder to the filter.

In this specification the term "d50 (by volume)" refers to a d50 (by volume) measurement as measured by a Malvern Mastersizer® 3000 with Aero s dispersion unit, available from Malvern Panalytical Ltd, Malvern, UK. Dispersion conditions: Air pressure=2 barg, feed rate=65%, hopper gap=1.2 mm. Refractive index and absorption parameters set in accordance with instructions provided in the Malvern Mastersizer® 3000 User Manual.

In this specification the term "vacuum generator" refers to an apparatus or combination of apparatus that function to produce a pressure reduction. Non-limiting examples of suitable apparatus include vacuum generators that operate on the venturi principle, vacuum pumps, for example rotary vane and liquid ring vacuum pumps, and regenerative blowers.

In this specification the term "pressure sensor" refers to an apparatus or combination of apparatus that function to measure an absolute and/or relative pressure. Non-limiting examples of suitable apparatus include pressure transducers which may be diaphragm pressure transducers. For example, a Wika® P30 pressure transmitter, available from WIKA Alexander Wiegand SE & Co. KG, Klingenberg, Germany may be used.

In this specification the term "controller" refers to a function that may comprise hardware and/or software. The controller may comprise a control unit or may be a computer program running on a dedicated or shared computing resource. The controller may comprise a single unit or may be composed of a plurality of sub-units that are operatively connected. The controller may be located on one processing resource or may be distributed across spatially separate processing resources. The controller may comprise a micro-controller, one or more processors (such as one or more microprocessors), memory, configurable logic, firmware, etc.

In this specification, ranges and amounts may be expressed as “about” a particular value or range. About also includes the exact amount. For example, “about 2 microns” means “about 2 microns” and also “2 microns.” Generally, the term “about” includes an amount that would be expected to be within experimental error. The term “about” may include values that are within 5% less to 5% greater of the value provided. For example, “about 2 microns” means “between 1.9 microns and 2.1 microns”.

In this specification the expression that a dry powder “consists of” means a dry powder that essentially consists of only the specified constituent(s), other than for unavoidable impurities as normally encountered as will be recognised by the person skilled in the art.

BRIEF DESCRIPTION OF THE DRAWINGS

Aspects and embodiments of the present disclosure will now be described, by way of example only, with reference to the accompanying drawings, in which.

DETAILED DESCRIPTION

The skilled reader will recognise that one or more features of one aspect or embodiment of the present disclosure may be combined with one or more features of any other aspect or embodiment of the present disclosure unless the immediate context teaches otherwise.

Figure 1:
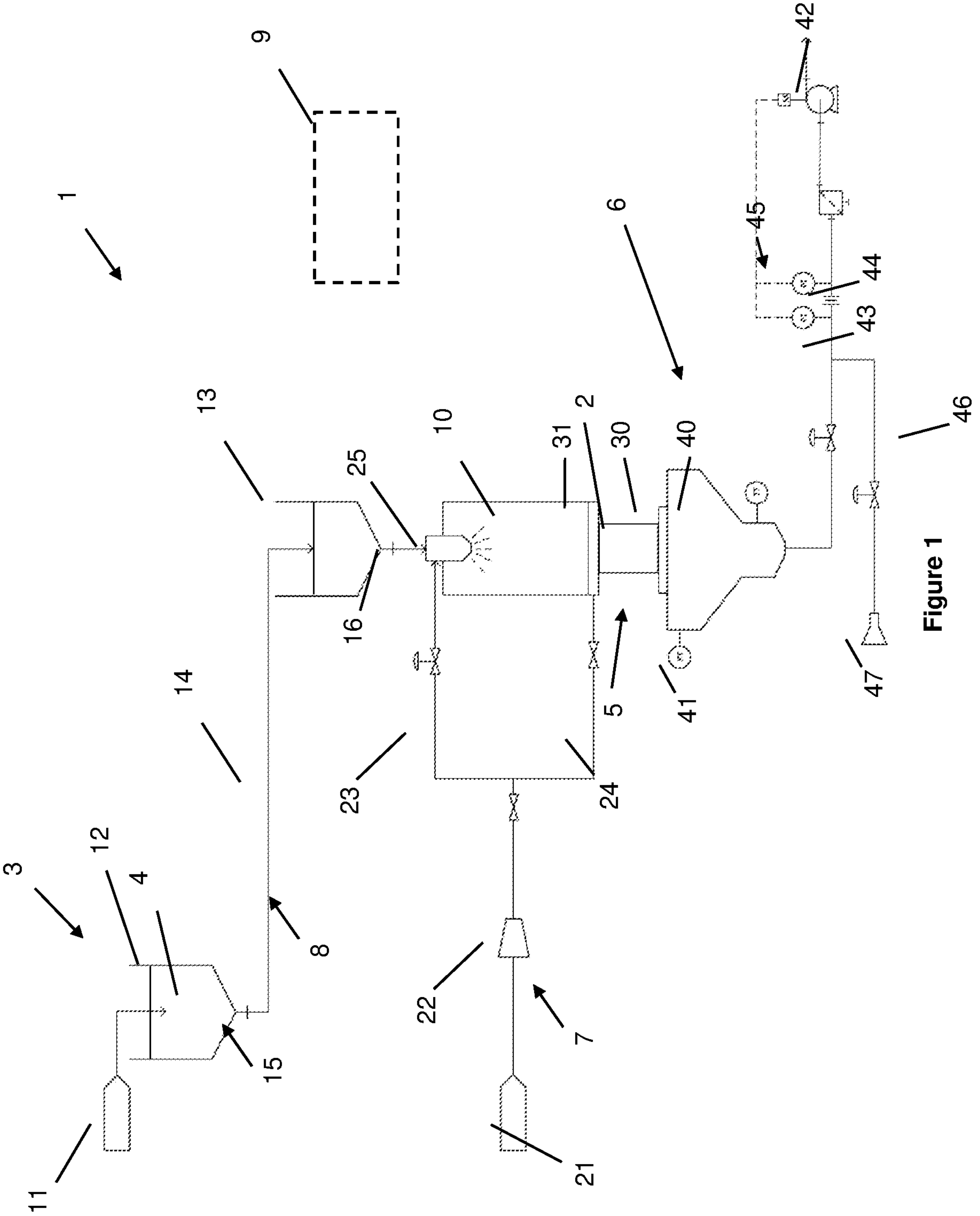
FIG. 1 is a schematic diagram of an apparatus for treating a filter for filtering particulate matter from exhaust gas.

Examples of a powder spraying system and a powder spray nozzle in accordance with the present disclosure will now be described with reference first to FIG. 1 which shows a schematic diagram of an apparatus 1 for treating a filter 2 for filtering particulate matter from exhaust gas. The filter 2 is of a type that comprises a porous substrate having an inlet face and an outlet face, the inlet face and the outlet face being separated by a porous structure.

The apparatus 1 comprises a reservoir 3 for containing a dry powder 4. A filter holder 5 is provided for holding the filter 2. A vacuum generator 6 is provided for establishing in use a primary gas flow through the porous structure of the filter 2 by applying a pressure reduction to the outlet face of the filter 2. A transport device 8 is provided for transporting the dry powder 4 from the reservoir 3 to a spray device 7. The spray device 7 is provided for receiving the dry powder 4 from the transport device 8 and spraying the dry powder 4 towards the inlet face of the filter 2. A controller 9 is provided which is configured to control operation of the apparatus 1.

The reservoir 3 may receive dry powder 4 from a dry powder inlet 11. The reservoir 3 functions as a source of the dry powder. The dry powder inlet 11 may be an output of an upstream bulk supply of the dry powder. For example, the dry powder inlet 11 may be a conduit connected upstream to a further reservoir of the dry powder 4. The dry powder inlet 11 may represent a manual, semi-automatic or automatic re-filling of the reservoir 3 through a lid or opening of the reservoir 3.

The reservoir 3 may comprise one or more hoppers. The reservoir 3 may comprise one hopper. In the illustrated example of FIG. 1, the reservoir 3 comprises a first hopper 12 and a second hopper 13. The second hopper 13 may be downstream of the first hopper 12 to receive dry powder 4 output from the first hopper 12. The one or more hoppers may be provided in separate housings. Alternatively, the one or more hoppers may be provided in a single housing. The one or more hoppers may comprise one or more chambers of a single container.

The reservoir 3 may comprise a dosing device 15. The dosing device 15 may dose the dry powder 4 by one or more of by weight, by volume, by particle number, by time. The dosing device 15 may be located at or near an outlet of the reservoir 3. The dosing device 15 may be located at or near an outlet of the one or more hoppers of the reservoir 3. The dosing device may be located at or near the outlet of the first hopper 12 or may be located at or near the outlet of the second hopper 13 or terminal hopper if more than two hoppers are provided.

The dosing device 15 may be gravimetrically fed with the dry powder 4 from the reservoir 3.

The dosing device 15 may be a loss in weight feeder. The dosing device 15 may be a volumetric feeder comprising an auger or screwthread arrangement. Non-limiting examples of suitable dosing devices include the Coperion® K-Tron Type K2-ML-T35 Gravimetric twin screw feeder available from Coperion GmbH, Stuttgart, Germany, the All-Fill®

Series 51 Micro-Fill and the All-Fill® Series 10 gravimetric or volumetric auger fillers available from All-Fill International Ltd, Sandy, UK.

The transport device 8 transports the dry powder 4 from the reservoir 3 to the spray device 7. The transport device 8 may gravimetrically or volumetrically feed the dry powder 4 at least part way towards the spray device 7.

The transport device 8 may comprise one or more components. The transport device 8 may comprise one or more conduits, for example, passages, pipes, hoses, etc.

Where the reservoir 3 comprises more than one hopper the transport device 8 may transport the dry powder 4 between the hoppers. The transport device 8 may gravimetrically or volumetrically feed the dry powder 4 between the hoppers. The transport device 8 may comprise a first conduit 14 extending between the first hopper 12 and the second hopper 13. The first conduit 14 may extend from a first housing to a second housing. Alternatively, the first conduit 14 may extend from a first chamber to a second chamber of a single container. The dry powder 4 may be gravimetrically fed along the first conduit 14.

The transport device 8 may comprise a supply conduit 16 extending from the second hopper 13 to the spray device 7. The supply conduit 16 may function for supplying the dry powder to the spray device 7. It will be understood that other suitable means, other than those explicitly described herein, may be used for supplying the dry powder 4 to the upstream end of the supply conduit 16.

The dosing device 15 may dose the dry powder 4 from the second hopper 13 directly into the supply conduit 16. In an alternative, the dosing device 15 may dose the dry powder 4 from the first hopper 12 into the second hopper 13, and the second hopper 13 may directly feed by gravity the supply conduit 16.

The spray device 7 is provided for receiving the dry powder 4 from the transport device 8 and spraying the dry powder 4 towards the inlet face of the filter 2. The spray device 7 may comprise a spray nozzle 25 and secondary gas flow generator for generating a secondary gas flow that may be used in combination with the spray nozzle 25 to spray the dry powder 4 towards the inlet face of the filter 2.

The secondary gas flow generator may comprise a compressed gas generator. In the illustrated example of FIG. 1 the secondary gas flow generator comprises a compressed air generator which may comprise a compressor 22. The compressor 22 may receive air from an air inlet 21 and supply compressed air to the spray nozzle 25 via a feed line 23. A return line 24 may be provided. Valves and controls necessary for operation may be provided as will be known to the skilled person.

An interconnection between the transport device 8, for example the supply conduit 16, and the spray device 7 may be provided at which interconnection the dry powder 4 is transferred into the spray device 7 from the transport device 8. The interconnection may be provided at or in the spray nozzle 25. The design and function of the spray nozzle 25 will be described further below.

The filter holder 5 may function to maintain the filter 2 in a stationary position during treatment. The filter holder 5 may grip an upper and/or a lower end of the filter 2. The filter holder 5 may comprise an inflatable upper seal bladder 31 (also called an upper inflatable collar) and/or an inflatable lower seal bladder 30 (also called a lower inflatable collar) that support respective upper and lower ends of the filter 2. The inflatable upper seal bladder 31 and the inflatable lower seal bladder 30 may contact and/or engage with an exterior surface of the filter 2. Each may form a liquid or air-tight seal around the filter 2. The inflatable upper seal bladder 31 and the inflatable lower seal bladder 30 may be supported by one or more housings (e.g. supported by an internal wall of the one or more housings).

The apparatus 1 may be configured such that the filter 2 is located in the filter holder 5 in a vertical orientation with the inlet face of the filter uppermost. The spray nozzle 25 may be located vertically above the inlet face. A spray direction of the spray nozzle 25 may be co-axial with a longitudinal axis of the filter 2. The spray direction and the longitudinal axis of the filter 2 may be coincident.

The apparatus 1 may further comprise a flow conduit 10 located between the spray device 7 and the inlet face of the filter 2. The flow conduit 10 may function to constrain and channel the primary gas flow towards the inlet face of the filter 2. The flow conduit 10 may function to align the primary gas flow such that a flow direction of the primary gas flow when it contacts the inlet face of the filter 2 is normal to the inlet face.

The flow conduit 10 may comprise a tube. The flow conduit 10 may comprise a cross-sectional shape that matches the cross-sectional shape of the inlet face of the filter 2. The flow conduit 10 may comprise a size that matches the size of the inlet face of the filter 2.

The spray device 7 may extend into the flow conduit 10. For example, the spray nozzle 25 may be located within an upper region of the flow conduit 10. The spray nozzle 25 may be located coincident with a longitudinal axis of the filter 2.

The inlet face of the filter 2 may be located greater than 10 cm, optionally greater than 20 cm from the spray device 7. Particular benefit may be found when the inlet face of the filter 2 is located greater than 75 cm, optionally greater than 100 cm from the nozzle outlet of the spray nozzle 25. Additionally, or alternatively the spray device, for example the spray nozzle 25, may be located at a distance from the inlet face of the filter 2 that is up to 4 times a diameter of the inlet face of the filter 2.

The vacuum generator 6 is provided for establishing in use the primary gas flow through the porous structure of the filter 2 by applying a pressure reduction to the outlet face of the filter 2. The vacuum generator 6 may comprise a vacuum cone 40 that may define a funnel that engages the outlet face of the filter 2. The inflatable lower seal bladder 30 may form a seal between the outlet face of the filter 2 and the vacuum cone 40. The vacuum generator 6 may comprise a vacuum pump 42 connected to the flow cone by a conduit 43. The vacuum pump 42 may be controlled to control the volumetric flow rate of the primary gas flow.

The vacuum generator 6 may be provided with a volumetric flow rate sensor. The volumetric flow rate sensor may be an orifice plate 44 in combination with pressure sensors 45 located along the conduit 43. The vacuum generator 6 may comprise a bypass conduit 46 extending to an intake 47.

The apparatus 1 may further comprises a pressure sensor 41 for monitoring a back pressure of the filter 2. A single pressure sensor 41 may be used. The single pressure sensor 41 may be located in the vacuum generator 6, optionally in a filter holder or other housing, for example the vacuum cone 40, of the vacuum generator.

The controller 9 controls operation of at least the vacuum generator 6 and the spray device 7. In FIG. 1 operative connections between the controller 9 and a remainder of the apparatus 1 are omitted for clarity. However, the skilled person would be aware that necessary connections of any suitable means may be provided. Such connections may be wired or wireless.

The controller 9 may be configured to control the transfer of the dry powder 4 from the reservoir 3 to the spray device 7 by the transport device 8 independently of controlling the primary gas flow produced by the vacuum generator 6. For example, the controller 9 may control operation of the dosing device 15.

The controller 9 may be configured to control spraying of the dry powder 4 towards the inlet face of the filter 2 independently of controlling the primary gas flow. Use of the term 'independently' in the present specification refers to the ability of the controller 9 to control each of the variables of the spraying of the dry powder 4 and the primary gas flow individually and irrespective of the status of the other variable. For example, the controller 9 may establish the primary gas flow without simultaneously spraying the dry powder 4. For example, the controller 9 may increase or decrease the rate of spraying of the dry powder 4 without altering the volumetric flow rate of the primary gas flow. For example, the controller 9 may increase or decrease the volumetric flow rate of the primary gas flow without altering the rate of spraying of the dry powder 4. For example, the controller 9 may control operation of the spray device 7 independently of controlling operation of the vacuum pump 42.

The controller 9 may be configured to operate the vacuum generator 6 to establish the primary gas flow before the dry powder 4 is transferred to the spray device 7 and sprayed towards the inlet face of the filter 2.

The controller 9 may be configured to control the secondary gas flow generator, for example the compressor 22, independently of the vacuum generator 6. The controller 9 may be configured to operate the vacuum generator 6 to maintain the primary gas flow as a continuous gas flow through the porous structure and to operate the secondary gas flow generator, for example the compressor 22, for only a portion of a period of the primary gas flow.

The controller 9 may be configured to control the vacuum generator 6 to control a level of the pressure reduction applied to the outlet face of the filter 2 independently of controlling the transport device 8 and/or the spray device 7 to control a speed or mass rate of the dry powder 4 sprayed towards the inlet face of the filter 2.

The controller 9 may be configured to stop the spraying of the dry powder 4 towards the inlet face of the filter 2 when a pre-determined back pressure of the filter 2 is reached, for example as detected by the pressure sensor 41. The pre-determined back pressure may be an absolute back pressure or alternatively may be a relative back pressure. The controller 9 may be configured to stop the spraying of the dry powder 4 towards the inlet face of the filter 2 when a pre-determined total spraying time is reached.

The apparatus 1 may be used to treat a filter with a dry powder 4 comprising or consisting of one or more refractory powders, optionally comprising one or more fumed refractory powders, and or one or more aerogels. Additionally or alternatively, the apparatus 1 may be used to treat a filter with a dry powder 4 comprising or consisting of a metal compound for forming by thermal decomposition a metal oxide. In examples the metal compound may comprise or consist of a metal hydroxide, a metal phosphate, a metal carbonate, a metal sulphate, a metal perchlorate, a metal iodide, a metal oxalate, a metal acetate, a metal chlorate or a mixture thereof.

An example of a method of treating a filter in accordance with the present disclosure will now be described with reference to FIG. 2 which shows a flow diagram illustrating a method for manufacturing a filter 2 incorporating use of the apparatus 1. By way of example only the method will be described with reference to a filter 2 provided with a catalytic coating.

In step S21 a catalytic slurry is prepared by methods as known in the art.

In step S22 a washcoat is prepared from the catalytic slurry by methods as known in the art. The washcoat may be, for example, a hydrocarbon trap, a three-way catalyst (TWC), a NOx absorber, an oxidation catalyst, a selective catalytic reduction (SCR) catalyst, a lean NOx catalyst and combinations of any two or more thereof.

In step S23 the washcoat is dosed and applied to a bare filter 2 by methods as known in the art. For example the washcoat may be applied to a first face of the filter 2 (e.g. an upper face) and an opposite, second face (e.g. a lower face) of the filter 2 may be subjected to at least a partial vacuum to achieve movement of the washcoat through the porous structure of the filter 2. The filter 2 may be coated in a single dose wherein washcoat may be applied to the filter 2 in a single step with the filter 2 remaining in a single orientation. Alternatively, the filter 2 may be coated in two doses. For example, in a first dose the filter 2 may be in a first orientation with a first face uppermost and a second face lowermost. A coating may be applied to the first face and coats a portion of the length of the filter 2. The filter 2 may then be inverted so that the second face is uppermost. A coating may then be applied to the second face in order to coat the portion of the filter 2 that was uncoated by the first dose. Beneficially, a two-dose process may allow different coatings to be applied to each end of the filter 2.

In step S24 the filter 2 may be dried.

In step S25 the filter 2 may be calcined by methods as known in the art.

In optional step S26 the back pressure of the filter 2 before treatment may be measured.

In optional step S27 the filter 2 may be placed in stock to await treatment. Thereafter, in step S28 the filter 2 may be removed from stock and passed for treatment. Alternatively, the filter 2 may be treated immediately, i.e. by proceeding directly to step S29.

In step S29 the filter 2 may be treated as will be described in further detail below with reference to FIG. 3.

In step S30, after treatment, the filter 2 may be calcined.

Calcining the filter may be carried out at a temperature selected to produce thermal decomposition of the dry powder 4 if appropriate.

The calcination temperature may be selected to be at least 150° C., optionally at least 250° C., optionally at least 500° C. In some embodiments it is preferred that the calcination temperature is no greater than 550° C. However, in other embodiments, the calcination temperature may be selected to be greater than 550° C. The calcination temperature may be selected to be up to 900° C., optionally up to 1150° C. In one example the calcination temperature may be selected to be between 300° C. and 500° C. In another example the calcination temperature may be selected to be about 520° C. In another example the calcination temperature may be selected to be about 580° C. In another example the calcination temperature may be selected to be about 900° C.

The calcination may be carried out for a period of 30 to 90 minutes, optionally 30 to 60 minutes. In one example the period is about 35 minutes. In another example the period is about 60 minutes. Within the calcination, the dwell time of 1 to 15 minutes, optionally 5 to 10 minutes.

In optional step S31 the back pressure of the filter 2 after treatment may be measured.

In step S32 the finished filter 2 may be readied for delivery to a customer.

Figure 2:
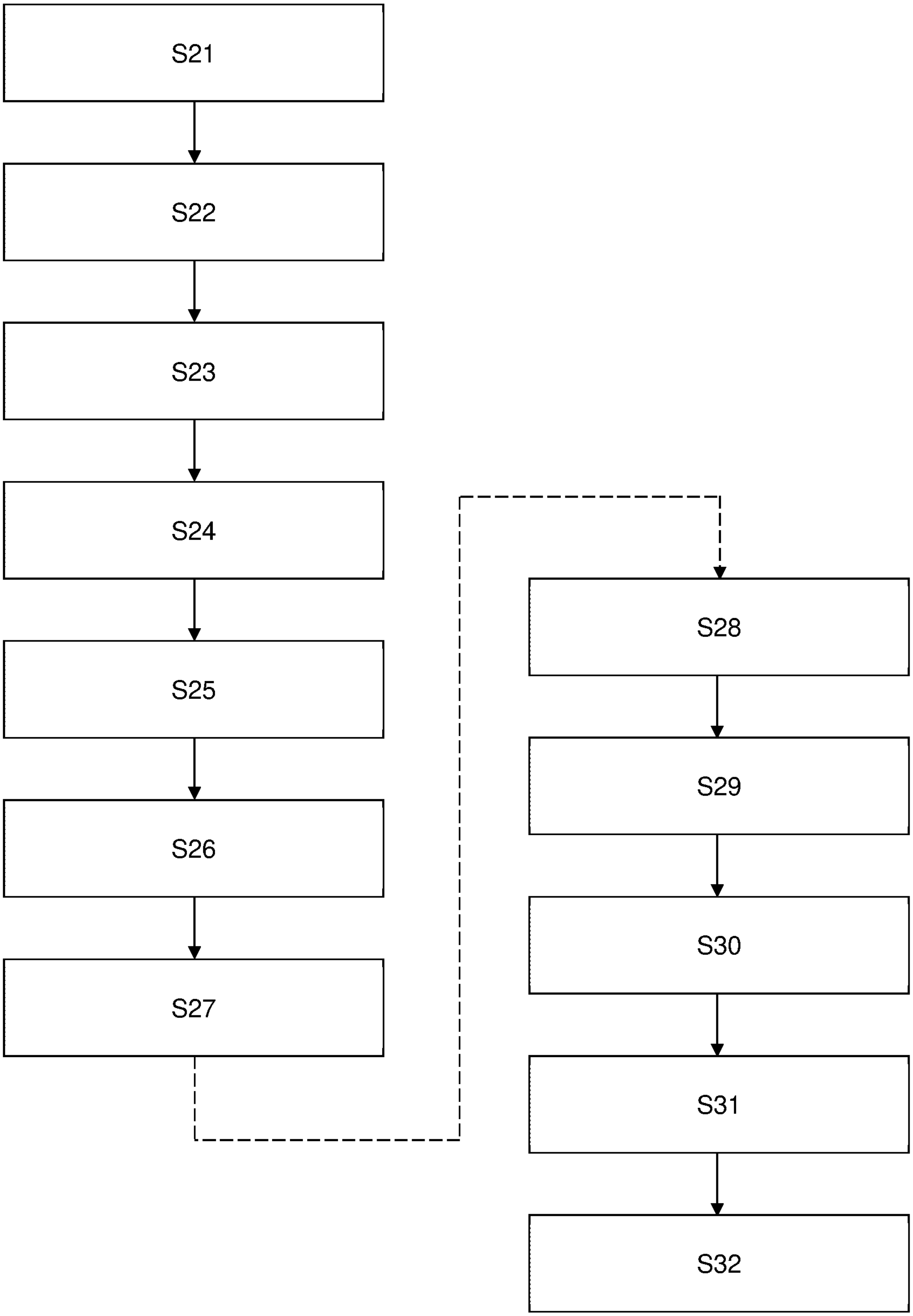
FIG. 2 is a flow diagram illustrating a method for manufacturing a filter incorporating a method for treating a filter using the apparatus of FIG. 1.
Figure 3:
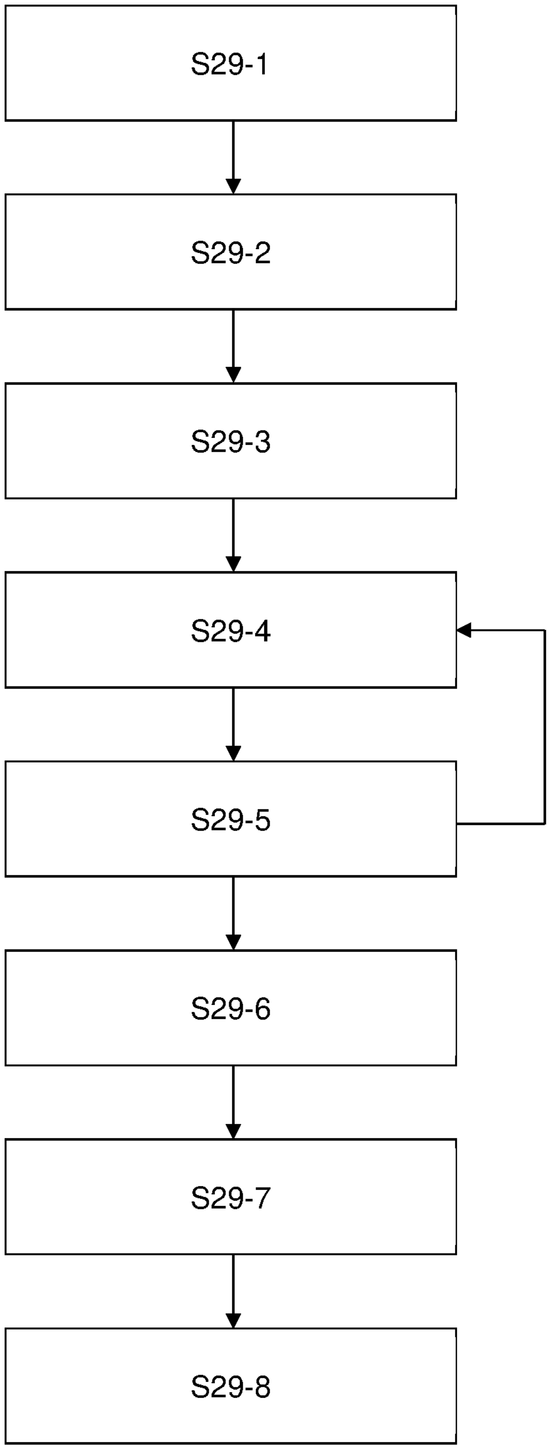
FIG. 3 is a flow diagram illustrating a method for treating a filter for filtering particulate matter from exhaust gas using the apparatus of FIG. 1.

FIG. 3 shows a flow diagram illustrating the treatment of step S29 of FIG. 2.

In step S29-1 the filter may be loaded into the filter holder 5. The filter 2 may be held in a stationary position during treatment. The filter 2 may be gripped by the filter holder 5 at an upper and/or a lower end of the filter 2. The inflatable upper seal bladder 31 and the inflatable lower seal bladder 30 may be inflated to contact and/or engage with the exterior surface of the filter 2. The filter 2 may be held in a vertical orientation with the inlet face of the filter uppermost. Operation of the filter holder 5, for example inflation of the inflatable upper seal bladder 31 and the inflatable lower seal bladder 30 may be controlled by the controller 9.

In step S29-2 the vacuum generator 6 may activated by the controller 9 to establish the primary gas flow through the filter 2. Optionally, the primary gas flow is established before the dry powder 4 is transferred to the spray nozzle 25 of the spray device 7 and sprayed towards the inlet face of the filter 2. A level of the pressure reduction generated by the vacuum generator 6 may be controlled by the controller 9 independently of a speed or mass rate of the transfer of the dry powder 4 from the reservoir 3 to the spray device 7. The primary gas flow may have a volumetric flow rate of 10 $m^3$/hr to 5,000 $m^3$/hr, optionally 400 $m^3$/hr to 2,000 $m^3$/hr, optionally 600 $m^3$/hr to 1000 $m^3$/hr.

In step S29-3 the back pressure of the filter 2 may be measured while the primary gas flow is established but before the secondary gas flow is established. The back pressure may be measured by use of the pressure sensor 41. The back-pressure measurement in step S29-3 may be in addition to, or in place of the back-pressure measurement of step S26. Alternatively, the back-pressure measurement of step S26 may be used in place of the back-pressure measurement of step S29-3. The back-pressure measurement of step S26 and/or the back-pressure measurement of step S29-3 may be used by the controller 9 as a measure of a first back pressure of the filter 2 prior to treatment.

In step S29-4 the dry powder 4 is sprayed at the inlet face of the filter 2 by the spray device 7. During spraying of the dry powder 4 the dry powder 4 may be supplied to the spray device 7 by the transport device 8.

The spraying of the dry powder 4 towards the inlet face of the filter 2 is optionally controllable by the controller 9 independently of establishing and controlling the primary gas flow.

During step S29-4 the secondary gas flow, for example supplied by the compressor 22, which is separate to the primary gas flow, may be used to transfer the dry powder 4 from the reservoir 3 to the spray device 7. Optionally the secondary gas flow is controllable by the controller 9 independently of the primary gas flow. For example, the controller 9 may control operation of the compressor 22 and/or the valves and/or the spray nozzle 25 of the spray device 7 independently of controlling operation of the vacuum pump 42. The dry powder 4 may be sprayed towards the inlet face of the filter 2 by use of the secondary gas flow. The secondary gas flow may comprise a flow of compressed gas, optionally air.

During step S29-4 the primary gas flow is optionally maintained as a continuous flow. During step S29-4 the secondary gas flow may be applied as a single burst or a plurality of intermittent bursts.

In step S29-5 the back pressure of the filter 2 may be monitored. The back pressure may be monitored by use of the pressure sensor 41. The controller 9 may be configured to stop the spraying of the dry powder 4 towards the inlet face of the filter 2 when a pre-determined back pressure is reached. If the pre-determined back pressure has not yet been reached, then the controller 9 be configured to return to step S29-4 and continue spraying of the dry powder 4. This feedback may be continuous and need not involve any pause in the spraying of the dry powder 4, i.e. the controller 9 may continuously monitor the back pressure of the filter 2 as spraying of the dry powder 4 is on-going.

The pre-determined back pressure may be an absolute back pressure. The absolute back pressure may be between 20-180 mbar at a flowrate of 600 $m^3$/hr.

Alternatively, the pre-determined back pressure may be a relative back pressure. For example, a back pressure relative to the first back pressure of the filter 2 prior to treatment measured in step S26 and/or step S29-3 may be used. The back pressure may be measured as a percentage of the first back pressure. The predetermined back pressure when spraying of the dry powder 4 is stopped may be from 105% to 200%, optionally 125% to 150%, of the first back pressure.

In addition, or alternatively, spraying of the dry powder 4 towards the inlet face of the filter 2 may be stopped when a pre-determined total spraying time is reached. The pre-determined total spraying time may be from 1 to 60 seconds, optionally from 1 to 20 seconds, optionally about 10 seconds.

The controller 9 may be configured to stop the spraying of the dry powder 4 towards the inlet face of the filter 2 when either a pre-determined total spraying time or a pre-determined back pressure of the filter is first reached or a target mass of the dry powder has been sprayed towards the inlet face of the filter.

In step S29-6 the spraying of the dry powder 4 is stopped. For example, this may be achieved by the controller 9 stopping transfer of the dry powder by the transport device 8 and/or by stopping the secondary gas flow of the spray device 7. Optionally in step S29-6 the primary gas flow is maintained through the porous structure of the filter 2 for a time period after the stopping of the spraying of the dry powder 4. The controller 9 may be configured to operate the vacuum generator 6 for a time period after the stopping of the spraying of the dry powder 4.

Optionally, in step S29-6 the quantity of dry powder 4 delivered towards the inlet face of the filter 2 may be measured. The controller 9 be configured to determine the quantity of the dry powder 4 delivered from signal outputs from the dosing device 15, for example from an output from the loss in weight feeder.

The method may be configured to deliver a maximum loading of the filter of 10 to 40 g/l, optionally 15 to 30 g/l, optionally about 20 g/l of the dry powder 4; or to deliver a maximum loading of the filter of $<10$ g/l, optionally $<5$ g/l, optionally $<2$ g/l of the dry powder 4.

In step S29-7 the primary gas flow through the filter 2 is stopped. This may be achieved by the controller 9 stopping the vacuum generator 6, i.e. stopping the vacuum pump 42. Alternatively, this may be achieved by the controller operating valves of the vacuum generator 6 to divert the suction through the bypass conduit 46 to draw air in through intake 47. This may avoid the need to stop the vacuum pump 42 between treatments of successive filters 2 which may lead to a faster cycle time.

In step S29-8 the filter 2 is unloaded from the filter holder 5 by, for example, deflating the inflatable upper seal bladder 31 and the inflatable lower seal bladder 30. The filter 2 may then be removed and passed to step S30 as described above.

Figure 4:
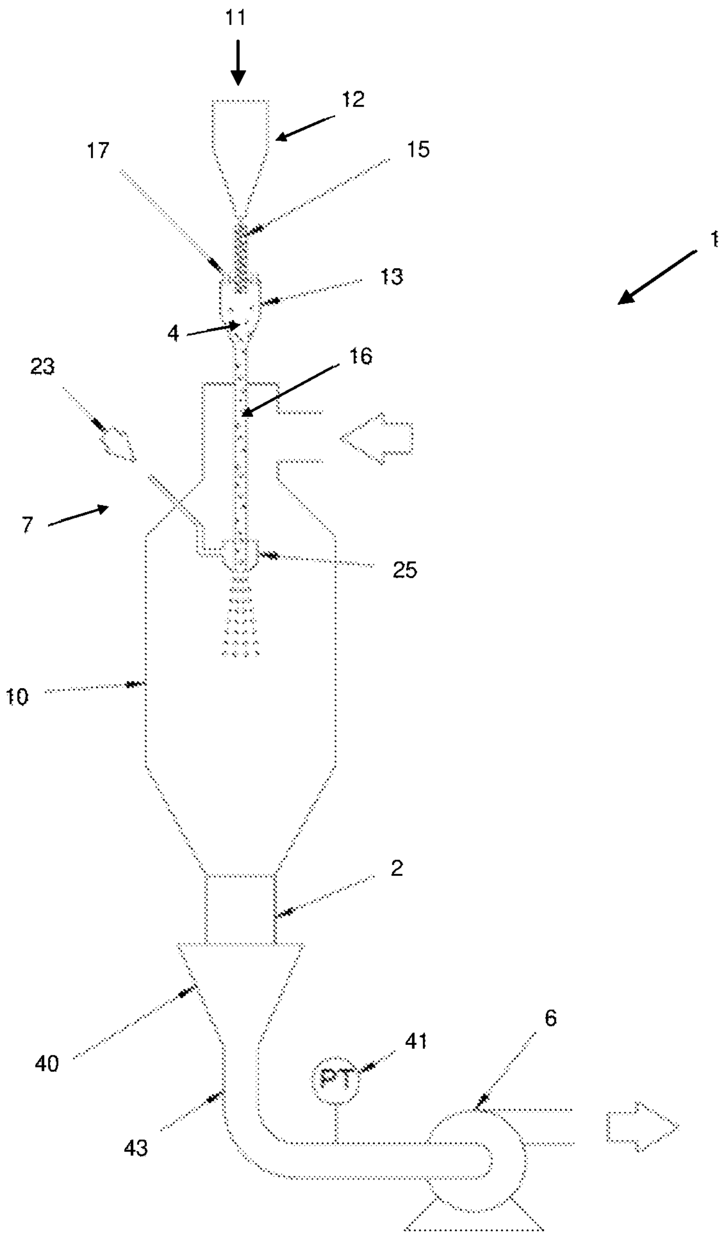
FIG. 4 shows another schematic diagram of an apparatus for treating a filter for filtering particulate matter from exhaust gas that incorporates a powder spraying system according to the present disclosure.

FIG. 4 shows a schematic diagram of another embodiment of the apparatus 1. The same reference numerals are used for the same parts of the two apparatus. In the following description only the differences between the two apparatus will be described, and in particular those relating to the spatial arrangement of the hoppers 12, 13 and spray nozzle 25. For all others detail the reader is directed to the description of the apparatus and methods given above with reference to FIG. 1, which applies equally to the present embodiment.

The apparatus 1 of FIG. 4 comprises a spray device 7 that comprises a spray nozzle 25 that is orientated towards a filter 2 that is mounted in a filter holder. A vacuum generator 6 establishes a primary gas flow through the apparatus 1.

The first hopper 12 may receive dry powder 4 from a dry powder inlet 11. The first hopper 12 functions as a source (or a part of the source) of the dry powder 4. The dry powder inlet 11 may be an output of an upstream bulk supply of the dry powder. For example, the dry powder inlet 11 may be a conduit connected upstream to a further hopper or reservoir of the dry powder 4. The dry powder inlet 11 may represent a manual, semi-automatic or automatic re-filling of the first hopper 12.

The source of the dry powder 4 may comprise one or more hoppers. The source of dry powder 4 may comprise one hopper. In the illustrated example of FIG. 4, the source of dry powder comprises a first hopper 12, which may function as a bulk hopper, and a second hopper 13, which may function as a feed hopper. The second hopper 13 is downstream of the first hopper 12 and receives the dry powder 4 output from the first hopper 12. The hoppers may be provided in separate housings. Alternatively, the hoppers may be provided in a single housing. The hoppers may comprise one or more chambers of a single container. One or both of the hoppers 12, 13 may be provided with one or more vents 17 for pressure equalisation with atmospheric pressure. One or both of the hoppers 12, 13 may be provided with a level sensor that may be used as part of a control system for automatic or semi-automatic re-filling of the hopper. One or both of the hoppers 12, 13 may be provided with a vibrator to promote flow of the dry powder 4 within the hopper towards and outlet of the hopper.

Where the source of the dry powder comprises multiple parts, e.g. multiple hoppers 12, 13 or storage locations these may be interconnected by conduits. Means for conveying the dry powder 4 between parts may be provided, e.g. means to move the dry powder from a first location to a second location, for example from a storage location to the first hopper 12 via the dry powder inlet 11.

Figure 5:
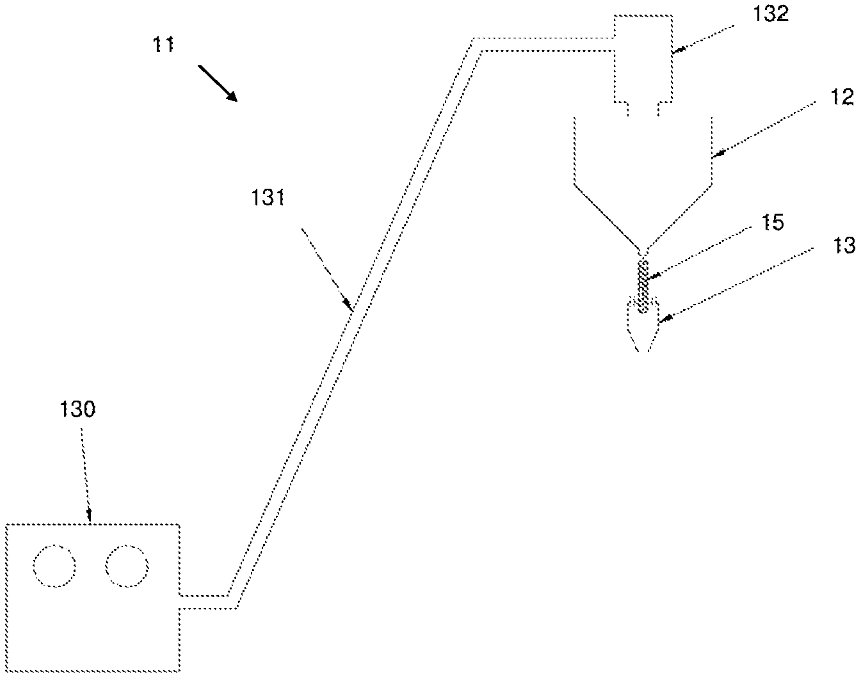
FIG. 5 is a schematic view of a powder transport apparatus for the apparatus of FIGS. 1 and 4.

As shown schematically in FIG. 5, the dry powder inlet 11 may be fed by an upstream powder delivery system. In this example, there is provided as part of the upstream powder delivery system a storage unit 130 for the dry powder 4 and a powder delivery unit 132 that delivers the dry powder 4 into the first hopper 12, e.g. into the bulk hopper.

The storage unit 130 and the powder delivery unit 132 may be interconnected by a transfer conduit 131. The transfer conduit 131 may be a pipe or conveyor belt or similar for transporting the dry powder 4, for example mechanically or pneumatically (by positive or negative pressure differential).

The storage unit 130 may, for example, be an enclosed chamber to mitigate dispersal of the dry powder 4 outside the powder delivery system. For example the storage unit 130 may be a glove box containing one or more containers of the dry powder 4.

The means for conveying the dry powder 4 along the transfer conduit 131 of FIG. 5 may be, for example, a vacuum conveyor such as those available from Piab USA, Inc., of Pittsburgh, USA, a diaphragm pump such as those available from Axflow of Slough, United Kingdom, or a powder feed system such as those available from Gema Switzerland GmbH, of St. Gallen, Switzerland.

The reservoir 3 may comprise a dosing device 15. The dosing device 15 may dose the dry powder 4 by one or more of by weight, by volume, by particle number, by time. The dosing device 15 may be located at or near an outlet of the reservoir 3. The dosing device 15 may be located at or near an outlet of the one or more hoppers of the reservoir 3. The dosing device may be located at or near the outlet of the first hopper 12 or may be located at or near the outlet of the second hopper 13 or terminal hopper if more than two hoppers are provided. In the illustrated example of FIG. 4 the dosing device is located between the first hopper 12 and the second hopper 13. The dosing device 15 may be gravimetrically fed with the dry powder 4 from the first hopper 12. The supply conduit 16 extends from the second hopper 13 to the spray device 7. The supply conduit 16 functions for supplying the dry powder to the spray device 7. The dry powder 4 may be dosed from the first hopper 12 to the second hopper 13 using the dosing device 15. The second hopper 13 may directly feed the supply conduit 16 by gravity.

Whereas a flow of gas may be used to entrain and mobilise the dry powder 4 as it is moved from the storage unit 130 to the first hopper 12, the feeding of the supply conduit 16 from a terminal part of the source of dry powder, e.g. the second hopper 13, is carried out by gravity assisted by a suction force generated in the spray nozzle 25 (as will be described below) and without the use of a gas flow in the supply conduit 16 to entrain the dry powder 4.

As above, the dosing device 15 may be a gravimetric and/or volumetric feeder comprising an auger or screw-thread arrangement. Non-limiting examples of suitable dosing devices include the Coperion® K-Tron Type K2-ML-T35 Gravimetric twin screw feeder available from Coperion GmbH, Stuttgart, Germany, the All-Fill® Series 51 Micro-Fill and the All-Fill® Series 10 gravimetric or volumetric auger fillers available from All-Fill International Ltd, Sandy, UK.

The spray device 7 is provided for receiving the dry powder 4 from the supply conduit 16, and spraying the dry powder 4 towards an inlet face of the filter 2. A controller is provided which is configured to control operation of the apparatus 1. The spray device 7 comprises a spray nozzle 25 and secondary gas flow generator for generating a secondary gas flow that may be used in combination with the spray nozzle 25 to spray the dry powder 4 towards the inlet face of the filter 2. FIG. 4 shows schematically a feed line 23 for supplying a secondary flow of gas to the spray nozzle 25. The design and function of the spray nozzle 25 will be described further below.

The secondary gas flow generator may comprise a compressed gas generator. The secondary gas flow generator may comprise a compressed air generator which may comprise a compressor. The compressor may receive air from an air inlet and supply compressed air to the spray nozzle 25 via the feed line 23. A return line may be provided. Valves and controls necessary for operation may be provided as will be known to the skilled person.

The source of the dry powder 4, together with the spray nozzle 25 and the supply conduit 16 may together comprise portions of a powder spraying system.

The source of the dry powder 4 may be aligned with the spray nozzle 25 (in particular with a first conduit of a nozzle body of the spray nozzle 25 as will be explained below). The source of dry powder 4 may be coincident with a longitudinal axis of the first conduit. For example, at least the second hopper 13 of the reservoir 3 may be aligned with the spray nozzle 25. The first hopper 12 may also be aligned with the spray nozzle 25 although this is optional.

Preferably, the spray nozzle 25 is orientated such that a nozzle outlet of the spray nozzle 25 faces downwards, e.g. vertically downwards, and at least the second hopper 13 is located directly above the spray nozzle 25.

The supply conduit 16 between the second hopper 13 and the spray nozzle 25 may be straight. The supply conduit 16 may have an internal diameter of 1 to 20 mm, optionally 5 to 10 mm.

Beneficially, use of a straight supply conduit 16 between the second hopper 13 and the spray nozzle 25 may help to improve powder flow and significantly reduce the chance of blockages in the supply conduit. In addition, the straight supply conduit 16 may help enable a system in which the dry powder 4 is fed to the spray nozzle 25 without the use of a gas stream, e.g. by gravity assisted by a suction force generated in the spray nozzle 25. In such systems it may be particularly important to reduce or remove any surfaces that might act as accumulation sites for powder build-up.

The filter holder 5 may be designed and function as described above to maintain the filter 2 in a stationary position during treatment.

The flow conduit 10 may be designed and function as described above to constrain and channel the primary gas flow towards the inlet face of the filter 2.

As described above, the spray nozzle 25 may be located vertically above the inlet face of the filter 2. A spray direction of the spray nozzle 25 may be co-axial with a longitudinal axis of the filter 2. The spray direction and the longitudinal axis of the filter 2 may be coincident. The spray nozzle 25 may extend into the flow conduit 10. For example, the spray nozzle 25 may be located within an upper region of the flow conduit 10. The spray nozzle 25 may be located coincident with a longitudinal axis of the filter 2. The inlet face of the filter 2 may be located greater than 10 cm, optionally greater than 20 cm from a nozzle outlet of the spray nozzle 25. Particular benefit may be found when the inlet face of the filter 2 is located greater than 75 cm, optionally greater than 100 cm from a nozzle outlet of the spray nozzle 25. For example, such distances may enable sufficient residence time for the dry powder 4 in the flow conduit 10 to better enable good mixing of the dry powder 4 in the flow of gas passing along the flow conduit 10. Additionally, or alternatively the spray nozzle 25, may be located at a distance from the inlet face of the filter 2 that is up to 4 times a diameter of the inlet face 2 of the filter.

The vacuum generator 6 may be designed and function as described above for establishing in use the primary gas flow through the porous structure of the filter 2 by applying a pressure reduction to the outlet face of the filter 2.

The controller may be designed and function as described above to control operation of the apparatus 1.

The apparatus 1 of FIG. 4 may be used to treat a filter with a dry powder 4 as described above with reference to, for example, FIGS. 2 and 3 and its associated description. In particular, the dry powder 4 may be of any of the type(s) described above.

The spray nozzle 25 that may be used, by way of example, as part of the apparatus 1 of FIG. 1 and/or FIG. 4 will now be described in more detail.

Figure 6:
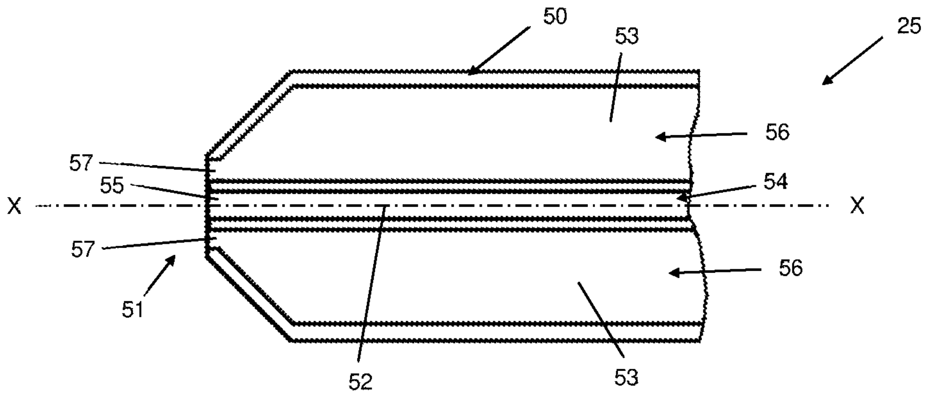
FIGS. 6 and 7 show schematically two types of powder spray nozzle according to the present disclosure.
Figure 7:
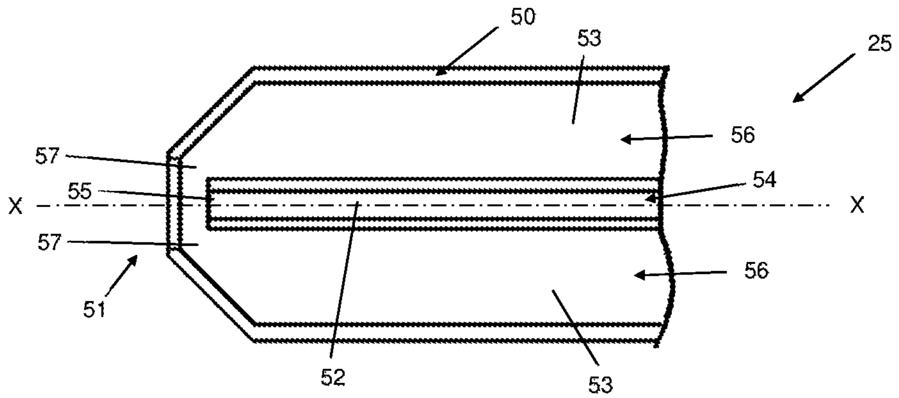

FIGS. 6 and 7 show schematically two types of spray nozzle 25. In both cases the spray nozzle 25 comprises a nozzle body 50 having a nozzle outlet 51, a first conduit 52 for the dry powder 4, and a second conduit 53 for gas. The first conduit 52 extends between a powder inlet 54 that may be connected to be in communication with the supply conduit 16 and a powder outlet 55. The second conduit 53 extends between a gas inlet 56 and a gas outlet 57. The gas outlet 57 is located in proximity to the powder outlet 55 such that a gas flowing through the second conduit 53 and out of the gas outlet 57 causes a reduction in pressure that produces a suction force at the powder outlet 55 to promote flow of the dry powder 4 through the first conduit 52 and out of the powder outlet 55 and the nozzle outlet 51. The powder outlet 55 and the gas outlet 57 are orientated to promote mixing of the gas with the dry powder 4.

In the spray nozzle 25 of FIG. 6 the powder outlet 55 is located at or near the nozzle outlet 51 of the nozzle body 50 such that an initial mixing of the gas with the dry powder 4 occurs outside of the nozzle body 50. The gas outlet 57 is located at or near, e.g. adjacent, the nozzle outlet 51 of the nozzle body 50.

In the spray nozzle 25 of FIG. 7 the powder outlet 55 is located within the nozzle body 50 upstream of the nozzle outlet 51 such that an initial mixing of the gas with the dry powder 4 occurs within an interior of the nozzle body 50 upstream of the nozzle outlet 51. The gas outlet 57 is located within the nozzle body 50 upstream of the nozzle outlet 51.

The gas outlet 57 may comprise an annular outlet that surrounds the powder outlet 55. The powder outlet 55 may be centrally located on a longitudinal axis X-X of the nozzle body 50.

Figure 8:
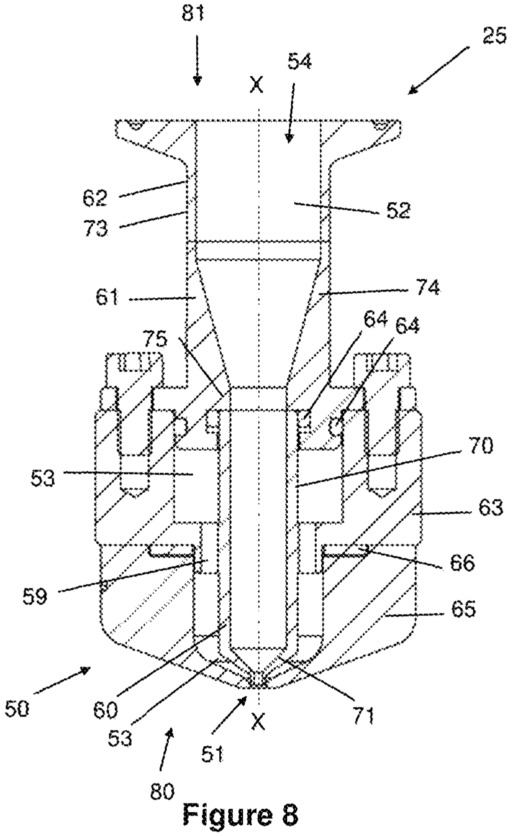
FIGS. 8 and 9 show cross-sectional views of a first embodiment of a powder spray nozzle according to the present disclosure.
Figure 9:
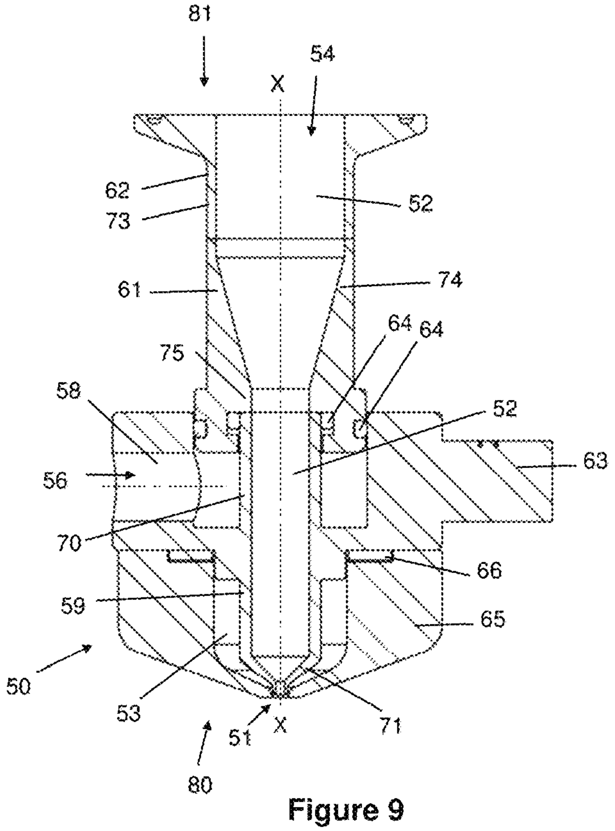
Figure 10:
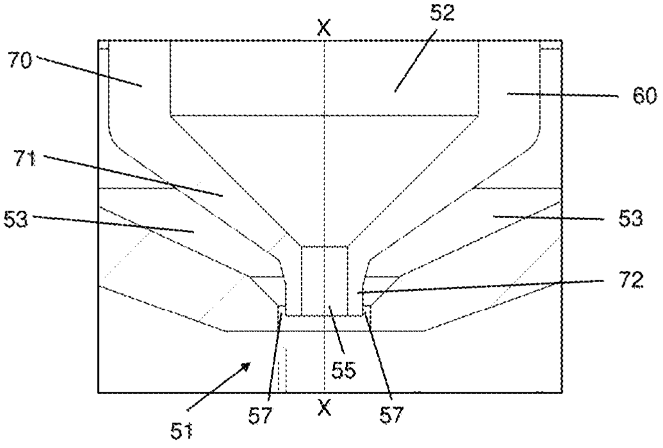
FIG. 10 shows an enlarged view of a portion of the powder spray nozzle of FIGS. 7 and 8.

FIGS. 8 to 10 show a first embodiment of a powder spray nozzle 25 according to the present disclosure. This embodiment is of the type shown schematically in FIG. 6, i.e. an initial mixing of the gas with the dry powder 4 occurs outside of the nozzle body 50.

The nozzle body 50 may comprise a plurality of parts that are assembled together. For example the nozzle body 50 may comprise a first body element 62, a second body element 63 and a cap element 65.

The second body element 63 may be connected to the first body element 62 and the elements may be sealed together with O-ring seals 64. Alternatively, the first body element 62 and the second body element 63 may be formed as a unitary part. The cap element 65 may be connected to the second body element 63 and the elements may be sealed together with a gasket seal 66.

A first tubular element 60 may be provided that defines at least a portion of the first conduit 52 and the powder outlet 55. The first tubular element 60 may be connected to, or comprise an integral part of, the second body element 63 of the nozzle body 50.

The first tubular element 60 may have a proximal portion 70 that is cylindrical and of constant internal diameter. It may further have a distal portion 71 that is tapered with a decreasing internal diameter in the direction of the powder outlet 55. It may further have a terminal portion 72 that itself defines the aperture of the powder outlet 55 that is cylindrical and of constant internal diameter.

A second tubular element 61 may be provided that defines another portion of the first conduit 52 and the powder inlet 54. The second tubular element 61 may be connected to, or comprise an integral part of, the first body element 62 of the nozzle body 50.

The second tubular element 61 may have a proximal portion 73 that itself defines the powder inlet 54 and is cylindrical and of constant internal diameter. It may further have a distal portion 74 that is tapered with a decreasing internal diameter in the direction of the first tubular element 60. It may optionally further have a terminal portion 75 that is connected to the proximal portion 70 of the first tubular element 60 that is cylindrical and of constant internal diameter.

The first conduit 52 is preferably a straight conduit between the powder inlet 54 and the powder outlet 55, e.g. the portions 73-75 of the second tubular element 61 and the portions 70-72 of the first tubular element 60 are preferably aligned and more preferably are each coincident with the longitudinal axis X-X of the nozzle body 50.

The nozzle outlet 51 is located in a first end face 80 of the nozzle body 50 and the powder inlet 54 is located in an opposite, second end face 81 of the nozzle body 50.

The first conduit 52 preferably comprises a bore whose internal diameter decreases from a first diameter at the powder inlet 54 to a second diameter at or adjacent the powder outlet 55, for example exclusively via one or more tapered sections, i.e. the distal portion 71 and the distal portion 74.

The bore of the first conduit 52 is preferably smooth and absent any abrupt inwardly-directed shoulders or crevices that might present obstructions or collection points for the dry powder 4 in use.

The cap element 65 may be coupled over a distal end of the first tubular element 60. The cap element 65 may comprise an aperture that constitutes the nozzle outlet 51. When coupled together, the distal end of the first tubular element 60 may be arranged in or adjacent the aperture in the cap element 65 such that an annular clearance between the first tubular element 60 and the cap element 65 defines the gas outlet 57 as shown most clearly in FIG. 10. The annular clearance between the first tubular element 60 and the cap element 65 may be 0.2 to 2.0 mm, optionally 0.2 to 1.0 mm, optionally 0.25 to 0.9 mm, optionally 0.6 mm.

The second body element 63 may define in part the second conduit 53. The gas inlet 56 may be orientated in a transverse direction, e.g. located on a side face of the nozzle body 50. The second conduit 53 may comprise a first portion 58 that extends transversely from the gas inlet 56 and a second portion 59 that extends longitudinally from the first portion 58 to the gas outlet 57.

The first tubular element 60 may be received within the second portion 59 of the second conduit 53 such that the second conduit 53 in that region comprises an annular conduit extending between an interior face of the second body element 63 and an exterior face of the first body element 62.

The powder outlet 55 in this embodiment is a single powder aperture. The single powder aperture may be provided in the distal end of the first tubular element 60 and is orientated along the longitudinal axis X-X of the nozzle body 50. The powder aperture may have an orifice diameter of 0.5 to 5.0 mm, optionally 1.0 to 2.5 mm, optionally 1.0 to 2.0 mm.

In use, the powder inlet 54 may be connected to the supply conduit 16 of the apparatus 1. The gas inlet 56 may be connected to the feed line 23. A flow of gas from the feed line 23 enters the spray nozzle 25 through the gas inlet 56 and passes along the first portion 58 and second portion 59 before exiting through the gas outlet 57 and nozzle outlet 51. The flow of the gas passing in proximity to the powder outlet 55 causes a reduction in pressure producing a suction force at the powder outlet 55. This suction force assists flow of the dry powder 4 down through the first conduit 52. The dry powder 4 from the supply conduit 16 is fed into the powder inlet 54 by gravity and the action of gravity drives the dry powder down the first conduit 52. The suction force at the powder outlet 55 assists in the movement of the dry powder 4, for example by helping to draw the dry powder 4 towards the powder outlet 55 and/or by fluidising the dry powder 4 in the first conduit 52 in the vicinity of the powder outlet 55 to prevent blockage of the powder outlet 55.

The feed line 23 may be supplied with gas at a flow rate of greater than 60 litres per minute (lpm), optionally greater than 100 lpm, optionally greater than 150 lpm, optionally greater than 200 lpm. In some examples the feed line supplies gas at greater than 60 lpm at a pressure of 1 barg; in some examples at greater than 100 lpm at a pressure of 2 barg; in some examples at greater than 140 lpm at a pressure of 3 barg; in some examples at greater than 175 lpm at a pressure of 4 barg; in some examples at greater than 215 lpm at a pressure of 5 barg; and in some examples at greater than 250 lpm at a pressure of 6 barg.

The decreasing diameter of the first conduit 52 in the direction of the powder outlet 55 may have an effect of imparting shear forces on the particles of the dry powder 4 that may produce a reduction in particle size of at least some of the particles. For example, the d50 (by volume) of the dry powder 4 may be reduced during transport through the first conduit 52.

The powder outlet 55 and the gas outlet 57 are orientated to promote mixing of the gas with the dry powder 4, for example in the region exterior to the nozzle body 50 and downstream of the nozzle outlet 51. The mixing of the gas with the dry powder 4 may assist in dispersion and/or de-agglomeration of the dry powder 4.

The number, size, shape and relative positioning of the powder outlet 55 and the gas outlet 57 may be used to control the shape and size of the dry powder plume emanating from the spray nozzle 25. For example, the embodiment of spray nozzle 25 of FIGS. 7 to 9 may be particularly suitable for generating a cone-shaped plume of dry powder that has a circular shape in transverse cross-section. The plume of dry powder may be centred on the longitudinal axis X-X of the nozzle body 50 which may be coincident with the longitudinal axis of the filter 2.

The flow velocity of the gas exiting the gas outlet 57 may also be varied to control the shape and size of the dry powder plume emanating from the spray nozzle 25.

Figure 11:
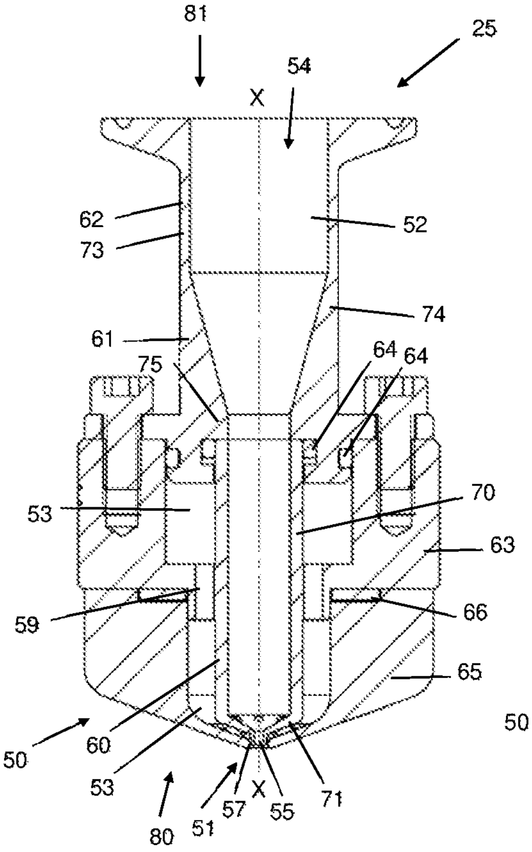
FIGS. 11 and 12 show cross-sectional views of a second embodiment of a powder spray nozzle according to the present disclosure.
Figure 12:
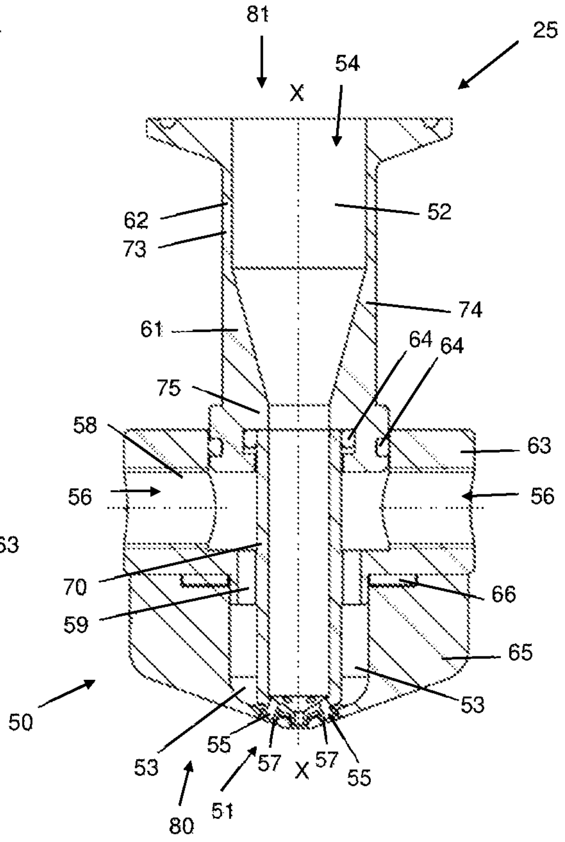

FIGS. 11 to 12 show a second embodiment of a powder spray nozzle 25 according to the present disclosure. The same reference numerals are used for the same parts of the spray nozzle 25 as those shown in the first embodiment of FIGS. 8 to 10. In the following description only the differences between the two apparatus will be described. For all others detail the reader is directed to the description of the spray nozzle given above with reference to FIGS. 8 to 10, which applies equally to the present embodiment.

In this embodiment the powder outlet 55 comprises a plurality of powder apertures in the distal end of the first tubular element 60. Each powder aperture may have an orifice diameter of 0.5 to 5.0 mm, optionally 1.0 to 2.5 mm, optionally 1.0 to 2.0 mm. At least one of the powder apertures may be orientated along the longitudinal axis X-X of the nozzle body 50. The remaining powder apertures may be orientated at divergent angles to the longitudinal axis X-X.

The gap between the first tubular element 60 and the cap element 65 defines the gas outlet 57 as before. Each powder aperture is associated with the gas outlet 57 of the second conduit 53. In particular, each powder aperture may be surrounded by an annular clearance from the cap element 65. The annular clearance between the first tubular element 60 and the cap element 65 around each powder aperture may be 0.2 to 2.0 mm, optionally 0.2 to 1.0 mm, optionally 0.25 to 0.9 mm, optionally 0.6 mm.

The embodiment of spray nozzle 25 of FIGS. 11 to 12 may be particularly suitable for generating a multi-cone-shaped plume of dry powder that has a shape comprised of overlapping circles in transverse cross-section. The plume of dry powder may be centred on the longitudinal axis X-X of the nozzle body 50 which may be coincident with the longitudinal axis of the filter 2. The action of the flow of the gas passing in proximity to the powder apertures of the powder outlet 55 causes a reduction in pressure producing a suction force at the powder outlet 55 as described above. This suction force assists flow of the dry powder 4 down through the first conduit 52.

Figure 13:
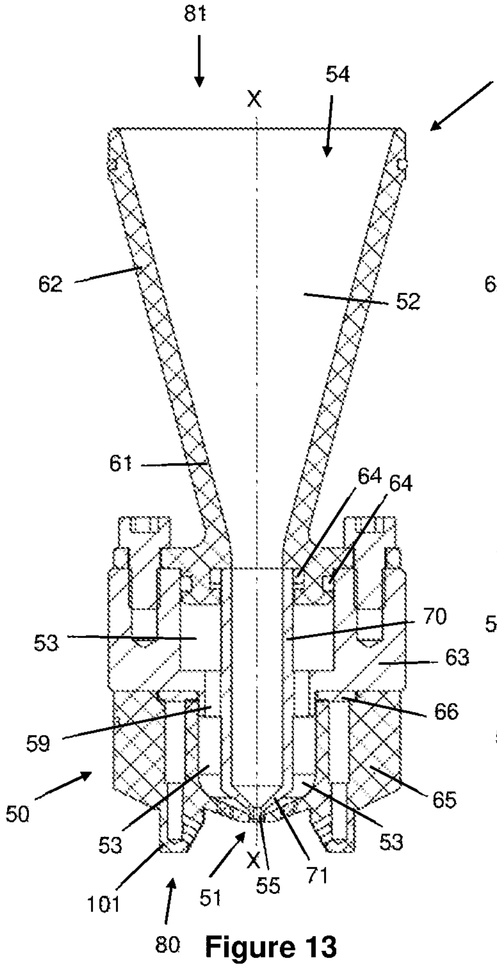
FIGS. 13 and 14 show cross-sectional views of a third embodiment of a powder spray nozzle according to the present disclosure.
Figure 14:
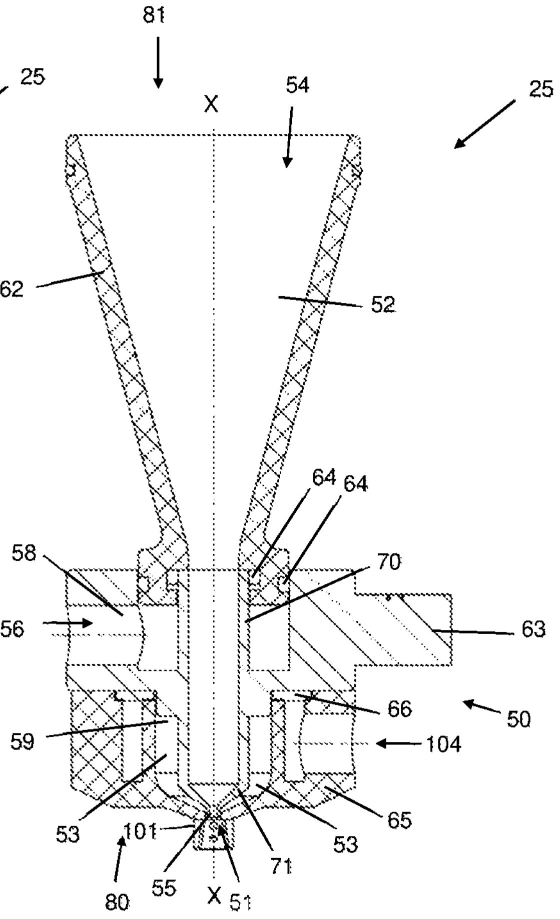
Figure 15:
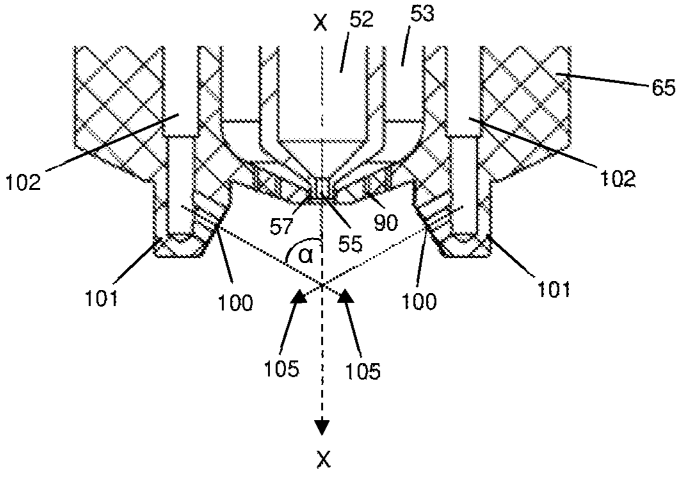
FIG. 15 shows an enlarged view of a portion of the powder spray nozzle of FIGS. 13 and 14.

FIGS. 13 to 15 show a third embodiment of a powder spray nozzle 25 according to the present disclosure. The same reference numerals are used for the same parts of the spray nozzle 25 as those shown in the first and second embodiments. In the following description only the differences between the apparatus will be described. For all others detail the reader is directed to the description of the spray nozzle given above with reference to FIGS. 8 to 12, which applies equally to the present embodiment.

In this embodiment the powder outlet 55 is a single powder aperture in the same manner as the first embodiment of FIGS. 8 to 10. The single powder aperture may be provided in the distal end of the first tubular element 60 and is orientated along the longitudinal axis X-X of the nozzle body 50. The powder aperture may have an orifice diameter of 0.5 to 5.0 mm, optionally 1.0 to 2.5 mm, optionally 1.0 to 2.0 mm.

The gas outlet 57 is the same as in the first embodiment except for the provision of a plurality of, optional, additional gas vents 90 as shown in FIG. 13.

This embodiment differs firstly in that the first conduit 52 comprise a bore whose internal diameter smoothly decreases from a first diameter at the powder inlet 54 to a second diameter at or adjacent the powder outlet 55. For example the bore may comprise a smoothly tapering section 85 and a cylindrical section 86. The bore of the first conduit 52 is preferably smooth and absent any abrupt inwardly-directed shoulders or crevices that might present obstructions or collection points for the dry powder 4 in use.

The embodiment also differs by the provision of one or more secondary gas outlets 100 that are spaced from the nozzle outlet 51 and are orientated to direct one or more secondary flows of gas 105 to impinge on the flow of gas and dry powder exiting the nozzle outlet 51. The impingement is exterior the nozzle body 50 and at a distance from the nozzle outlet 51.

The one or more secondary gas outlets 100 are orientated to direct the one or more secondary flows of gas 105 such that their angle of incidence, a, with the flow of gas and dry powder 103 exiting the nozzle outlet 51 is 30 to 90°, optionally 45 to 75°, optionally 60°, as shown in FIG. 15.

Two, 4, 6, 8 or more secondary gas outlets 100 may be provided. They may be provided as 1, 2, 3, 4 or more pairs of secondary gas outlets 100. Each pair of secondary gas outlets 100 may comprise two secondary gas outlets that are located on opposite sides of the nozzle outlet 51 from each other.

Each of the secondary gas outlets 100 may have an orifice diameter of 0.5 to 2.5 mm, optionally 1.0 to 2.5 mm.

The secondary gas outlets 100 may be provided in one or more legs 101 that project from a face of the nozzle body 50 that comprises the nozzle outlet 51 such that the one or more secondary gas outlets 100 are located axially downstream of the nozzle outlet 51. For example, secondary gas outlets 100 may be located 2 to 20 mm, optionally 8 to 15 mm axially downstream of the nozzle outlet.

Each leg 101 may comprise 1, 2, or more secondary gas outlets 100.

The nozzle body 50 may be provided with two legs 101. The two legs 101 may be opposed to each other across the nozzle outlet 51 as shown in FIGS. 13 to 15. This arrangement may be particularly suitable for generating an oval, elliptical, or fan-shaped plume of dry powder.

Alternatively, the nozzle body 50 may be provided with four legs 101. The four legs may be equi-spaced at 90° intervals around the nozzle outlet 51.

The nozzle body 50 may comprise a third conduit 102, separate from the second conduit 53, for supplying gas to the secondary gas outlets 100. The third conduit 102 may have an inlet 104 that may be provided in the cap element 65.

In use, as with the previous embodiments, the action of the flow of the gas passing in proximity to the powder outlet 55 causes a reduction in pressure producing a suction force at the powder outlet 55 as described above. This suction force assists flow of the dry powder 4 down through the first conduit 52. In addition, as with the previous embodiments, the powder outlet 55 and the gas outlet 57 are orientated to promote mixing of the gas with the dry powder 4, for example in the region exterior to the nozzle body 50 and downstream of the nozzle outlet 51. The mixing of the gas with the dry powder 4 may assist in dispersion and/or de-agglomeration of the dry powder 4. In addition the impingement of the secondary flows of gas 105 on the dry powder 4 may result in additional shaping of the plume and/or in additional dispersion and/or de-agglomeration of the dry powder 4.

Figure 16:
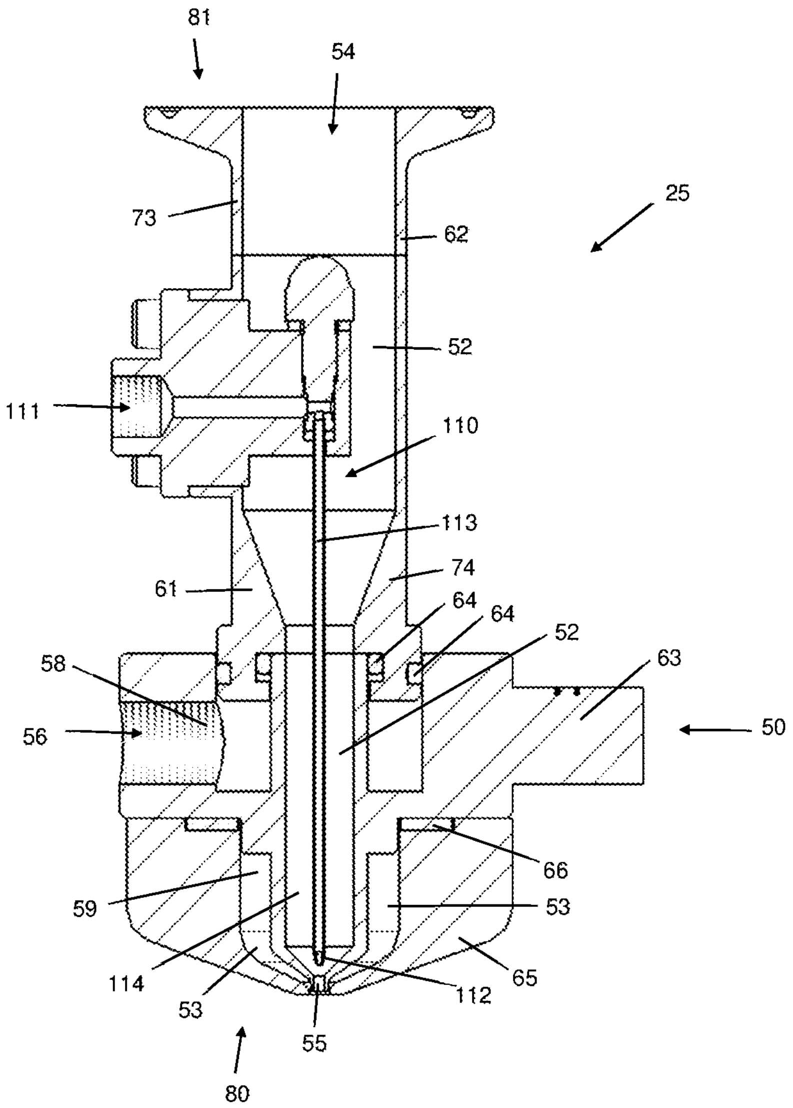
FIG. 16 shows a cross-sectional view of a fourth embodiment of a powder spray nozzle according to the present disclosure.

FIG. 16 shows a fourth embodiment of a powder spray nozzle 25 according to the present disclosure. The same reference numerals are used for the same parts of the spray nozzle 25 as those shown in the above embodiments. In the following description only the differences between the apparatus will be described. For all others detail the reader is directed to the description of the spray nozzle given above with reference to FIGS. 8 to 12, which applies equally to the present embodiment.

In this embodiment the spray nozzle 25 further comprises a clean out nozzle 110 located within the first conduit 52, the clean out nozzle 110 comprises an inlet 111 that is connectable to a supply of gas and an outlet 112 orientated towards the powder outlet 55.

The outlet 112 of the clean out nozzle may be located 4 to 25 mm from the powder outlet 55. The outlet 112 of the clean out nozzle may have an orifice diameter of 0.5 to 1.5 mm, optionally 0.5 mm.

In use, a compressed gas flow may be jetted out of the outlet 112 at an interior face of the powder outlet 55 to break up and dislodge any build-up of the dry powder 4 in the region of the powder outlet 55. The cleaning function of the clean out nozzle 110 may be actuated inbetween the treatment of each filter 2 to may be actuated during treatment of a filter 2, i.e. while a flow of the dry powder 4 is flowing through the first conduit 52. The flow of gas out of the clean out nozzle 110 may be in a single burst or in multiple bursts.

The clean out nozzle 110 may be configured to produce a suction force within the first conduit 52 to assist in flow of the dry powder 4 through the first conduit 52. The clean out nozzle 110 may also be configured to fluidise dry powder 4 within the first conduit 52, especially in the vicinity of the powder outlet 55.

The clean out nozzle 110 may comprise an elongate tubular element 113 located within the first conduit 52 to define an annular flow space 114 for the dry powder 4 between an external wall of the clean out nozzle 110 and an internal wall of the first conduit 52.

The clean out nozzle 110 may be incorporated into any of the embodiments of spray nozzle 25 described above.

In any of the embodiments described above, the source of dry powder 4 may comprise a source of a first dry powder and a source of a second dry powder. The first conduit 52 may comprise a first powder inlet in communication with the source of the first dry powder and a second powder inlet in communication with the source of the second dry powder. The gas flowing through the second conduit 53 and out of the gas outlet 57 may produce a suction force at the powder outlet 55 to promote flow of the first dry powder and the second dry powder through the first conduit 52 and out of the powder outlet 55 and the nozzle outlet 51. The first conduit 52 may comprise a first flow path for the first dry powder along at least a portion of its length and a second flow path for the second dry powder along at least a portion of its length, the first flow path and the second flow path being separate from one another. The first flow path and the second flow path may comprise concentrically-arranged flow paths.

Figure 17:
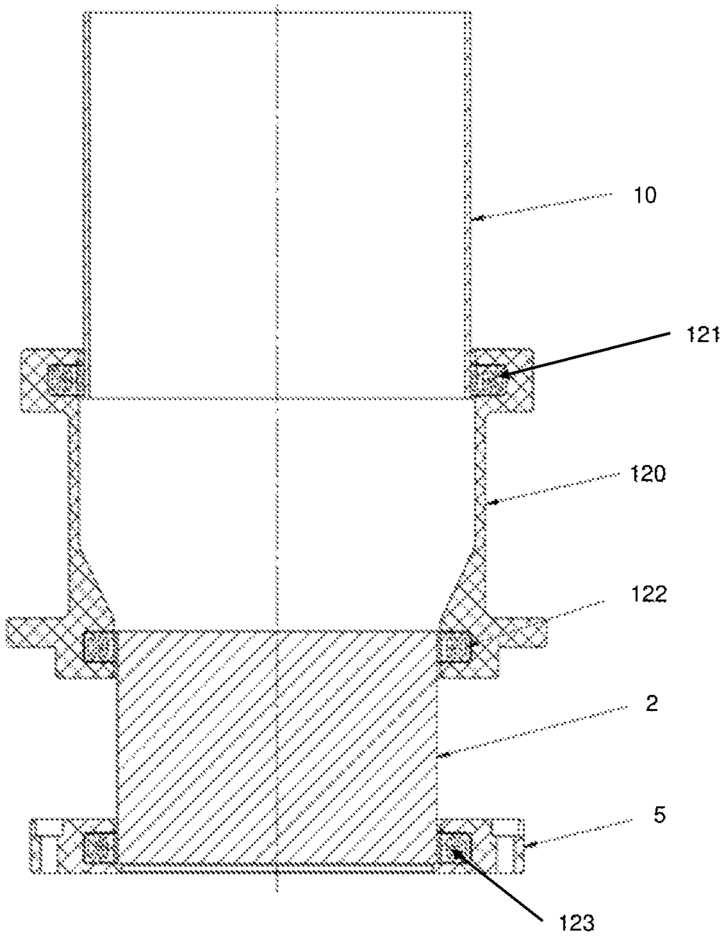
FIG. 17 is a cross-sectional view of an adapter part for the apparatus of FIGS. 1 and 4.

In any of the embodiments described above, the apparatus 1 may further comprise an adapter 120 between the flow conduit 10 and the filter 2, as shown by way of example in FIG. 17. The adapter 120 may function to adapt the shape and/or size of the primary gas flow to the shape and size of the inlet face of the filter 2. For example, the diameter of the flow conduit 10 may differ from the diameter of the inlet face. The diameter of the flow conduit 10 may be greater or less than the diameter of the inlet face. The shapes may also differ, for example the flow conduit 10 may have a circular cross-sectional shape and the inlet face of the filter 2 may have an oval shape.

The adapter 120 may comprise a tubular body provided with an upper seal 121 at its upper end to provide a fluid-tight connection with the flow conduit 10 and a lower seal 122 at its lower end to provide a fluid-tight seal around the inlet face of the filter 2. The lower seal 122 may be in addition to, or in place of the upper seal bladder 31 described above. A third seal 123 may be provided for a fluid-tight seal around the outlet face of the filter 2. The third seal 123 may be in addition to, or in place of the lower seal bladder 30 described above.

The upper seal 121, lower seal 122 and third seal 123 may be inflatable bladder seals or may be resilient, flexible non-inflated seals.

The upper end of the adapter 120 may have a first internal diameter adapted to the internal diameter of the lower end of the flow conduit 10. Preferably, the internal diameters are substantially equal to each other. Preferably the cross-sectional shapes at the interface between the parts also match. The lower end of the adapter 120 may have a second internal diameter adapted to the diameter of the inlet face of the filter 2. Preferably, the diameters are substantially equal to each other. Preferably the cross-sectional shapes at the interface between the parts also match.

The first internal diameter of the adapter 120 may be greater than the second internal diameter. Alternatively, the first internal diameter of the adapter 120 may be less than the second internal diameter.

The internal face of the adapter 120 is preferably smooth and without crevices or abrupt shoulders that might form collection points for the dry powder 4. For example, the internal face may transition smoothly from the first internal diameter to the second internal diameter, e.g. via one or more tapered sections as shown in FIG. 17.

In any of the embodiments described above, the flow conduit 10 may be empty so as to provide an unimpeded flow path between the spray device 7 and the inlet face of the filter 2. Alternatively, the flow conduit 10 may comprise a flow conditioner interposed between the spray device 7 and the inlet face of the filter 2, the flow conditioner acting to promote dispersion of the dry powder 4. For example, the flow conditioner may comprise one or more of a static mixer, a mesh, a sieve, a baffle, and an orificed plate.

Figure 18:
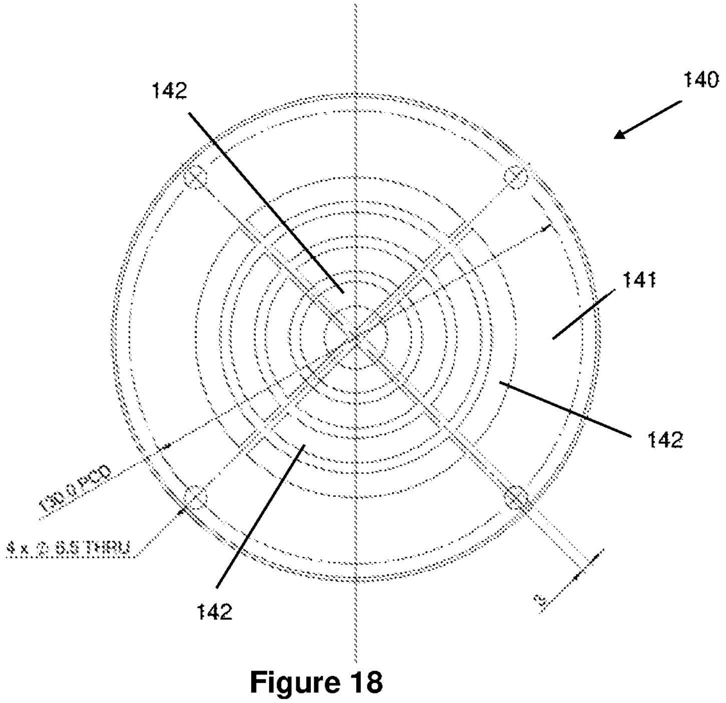
FIGS. 18 and 19 show a flow conditioner.
Figure 19:
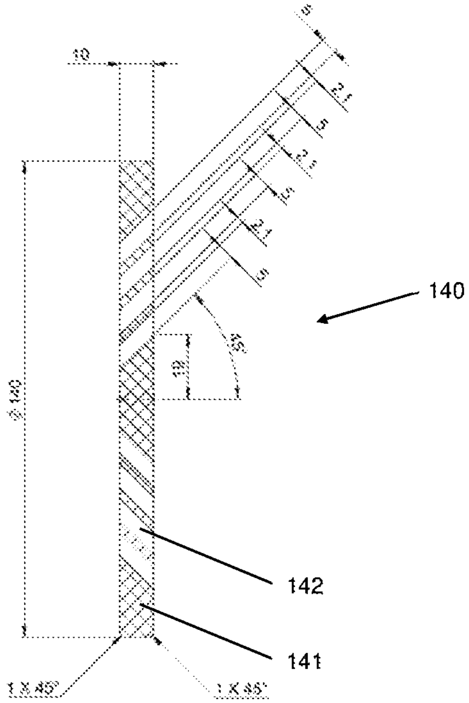
Figure 20:
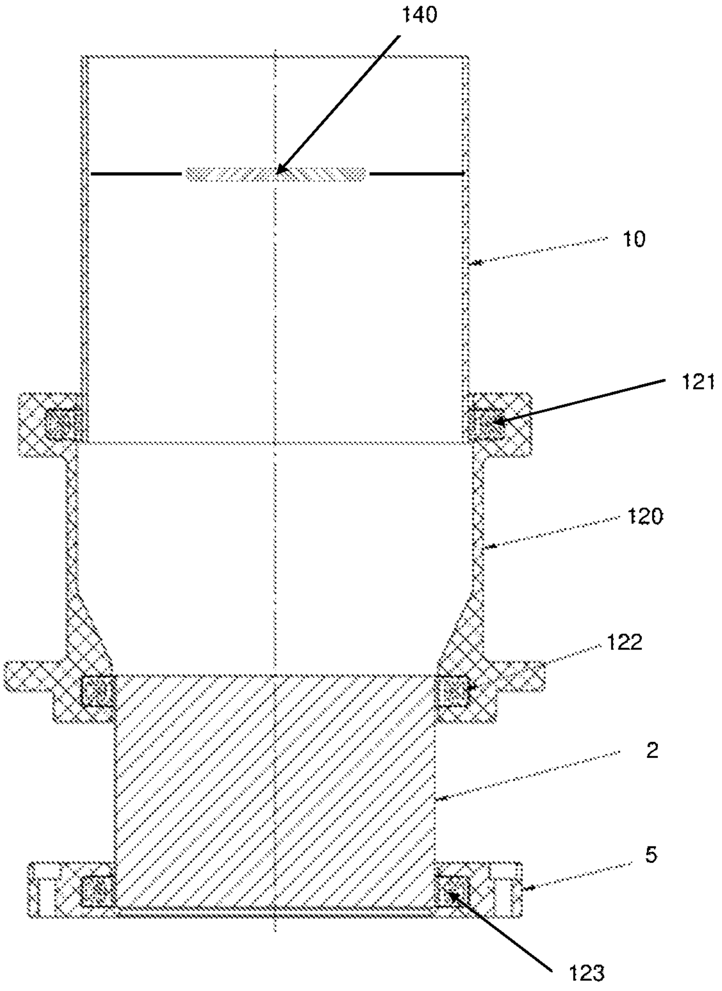
FIG. 20 shows a flow conditioner incorporated in a flow conduit of the apparatus of FIGS. 1 and 4.

FIGS. 18 and 19 show one example of a flow conditioner 140 in the form of an aperture disc that may be positioned part-way down the flow conduit 10 or the adapter 120 as shown in FIG. 20 to improve the homogeneity of the gas flow and/or gas velocity in the flow conduit 10. The apertured disc comprises a body 141 with a plurality of apertures 142, The apertures 142 may be annular or part-annular or of other form. As shown in FIG. 19, the apertures 142 may be angled relative to the longitudinal axis of the flow conditioner 10 to divert flow of the gas and dry powder 4 away from the longitudinal. The apertures 142 may be outwardly-divergent so as to direct a downward flow towards the periphery of the flow conditioner 10.

The flow conditioner 140 may be of various sizes, it may occupy part or all of the cross-section of the flow conduit 10. The flow conditioner 10 may force all flow via the flow conditioner 140 or may allow a portion of the flow to bypass the flow conditioner 140.

The flow conditioner 140 may be made integral with the flow conduit 10 or the adapter 120. Alternatively, the flow conditioner 140 may be made integral with the spray nozzle 25. For example, the flow conditioner 140 may form a diffuser attached to the spray nozzle 25 and positioned downstream of the nozzle outlet 51.

Figure 21:
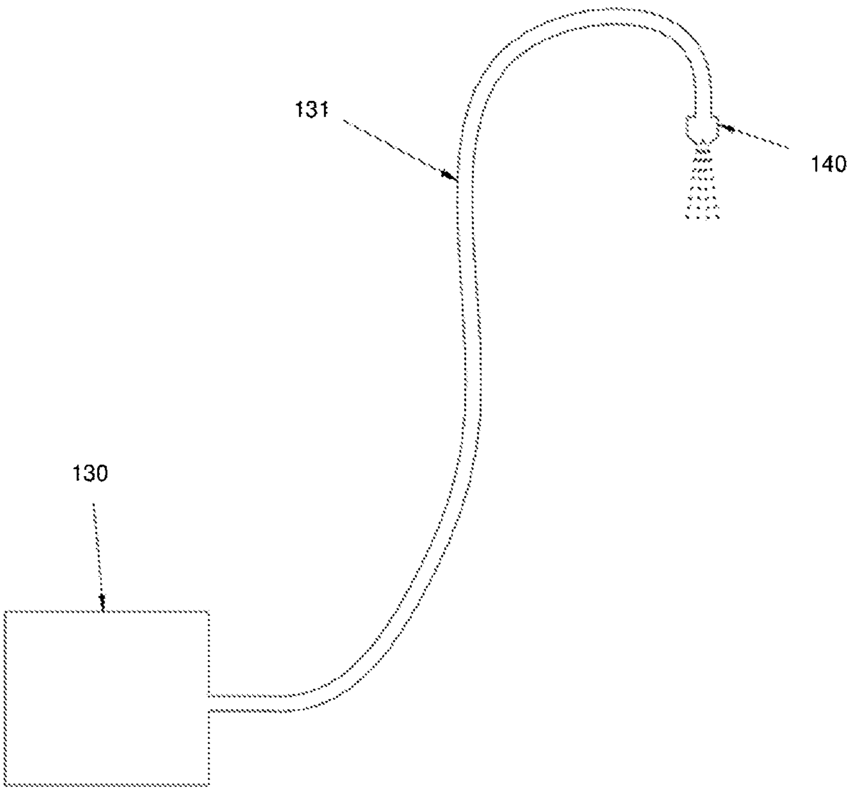
FIG. 21 shows another arrangement of the apparatus according to the present disclosure.

In an alternative arrangement, as shown schematically in FIG. 21, the flow conditioner 140 may be used to discharge a mixture of gas and dry powder 4 directly into the flow conduit 10 from a source of the dry powder 4, i.e. without an intervening spray nozzle. For example, dry powder may be conveyed from the storage unit 130 via a transfer conduit 131 (as described above) directly to an outlet incorporating the flow conditioner 140. In such an example, the dry powder 4 may be conveyed to the outlet incorporating the flow conditioner 140 by a powder feed system such as those available from Gema Switzerland GmbH, of St. Gallen, Switzerland.

In any of the embodiments described above, the flow conduit 10 may be sized and shaped to promote a uniform and preferably uniaxial flow of the primary flow of gas past the location of the spray nozzle 25. For example, the location of the inlet to the flow conduit 10 may be located a distance upstream of the spray nozzle 25 to permit the primary flow of gas to stabilise before reaching the spray nozzle 25. For example, the inlet to the flow conduit 10 may be greater than 50 cm, optionally greater than 100 cm, optionally greater than 140 cm before the location of the spray nozzle 25. Additionally or alternatively, the inlet to the flow conduit 10 may orientated to be parallel to or only minimally divergent from the longitudinal axis of the flow conduit 10. For example, the inlet to the flow conduit may be an inlet pipe for incoming air (e.g. open to atmosphere) that is angled at no more than 20°, optionally no more than 15°, optionally no more than 10°, divergent from the longitudinal axis of the flow conduit 10 within a distance of 100 cm, optionally 140 cm from the location of the spray nozzle 25.

According to the present disclosure the powder spraying system and/or powder spray nozzle may be used to produce a treated filter having one or more advantages compared to prior art filters.

Further aspects and embodiments of the present disclosure are set out in the following clauses:

Clause A1. A powder spraying system comprising:

a) a source of dry powder;

b) a spray nozzle; and c) a supply conduit connecting the source of dry powder with the spray nozzle;

wherein the spray nozzle comprises:

i) a nozzle body having a nozzle outlet;

ii) a first conduit for dry powder; and iii) a second conduit for gas;

the first conduit extending between a powder inlet in communication with the supply conduit and a powder outlet;

the second conduit extending between a gas inlet and a gas outlet, the gas outlet being located in proximity to the powder outlet such that a gas flowing through the second conduit and out of the gas outlet produces a suction force at the powder outlet to promote flow of a dry powder through the first conduit and out of the powder outlet and the nozzle outlet;

the powder outlet and the gas outlet being orientated to promote mixing of the gas with the dry powder.

Clause A2. The powder spraying system of clause A1, wherein the powder outlet is located within the nozzle body upstream of the nozzle outlet such that an initial mixing of the gas with the dry powder occurs within an interior of the nozzle body upstream of the nozzle outlet.

Clause A3. The powder spraying system of any preceding clause, wherein the gas outlet is located within the nozzle body upstream of the nozzle outlet.

Clause A4. The powder spraying system of clause A1, wherein the powder outlet is located at or near the nozzle outlet of the nozzle body such that an initial mixing of the gas with the dry powder occurs outside of the nozzle body.

Clause A5. The powder spraying system of clause A4, wherein the gas outlet is located at or near the nozzle outlet of the nozzle body.

Clause A6. The powder spraying system of any preceding clause, wherein the gas outlet comprises an annular outlet that surrounds the powder outlet.

Clause A7. The powder spraying system of any preceding clause, wherein the powder outlet is centrally located on a longitudinal axis of the nozzle body.

Clause A8. The powder spraying system of any preceding clause, wherein the powder outlet comprises a single powder aperture.

Clause A9. The powder spraying system of any one of clauses A1 to A7, wherein the powder outlet comprises a plurality of powder apertures, each powder aperture being associated with the gas outlet of the second conduit.

Clause A10. The powder spraying system of clause A9, wherein at least one of the plurality of powder apertures is orientated along a longitudinal axis of the nozzle body.

Clause A11. The powder spraying system of clause A9 or clause A10, wherein at least one of the plurality of powder apertures is orientated at a divergent angle to a longitudinal axis of the nozzle body.

Clause A12. The powder spraying system of any one of clauses A8 to A11, wherein the or each powder aperture has an orifice diameter of 0.5 to 5.0 mm, optionally 1.0 to 2.5 mm, optionally 1.0 to 2.0 mm.

Clause A13. The powder spraying system of any one of clauses A8 to A12, wherein the gas outlet comprises an annular aperture that surrounds the or each associated powder aperture.

Clause A14. The powder spraying system of clause A6 or clause A13, wherein the annular aperture has a width of 0.2 to 2.0 mm, optionally 0.2 to 1.0 mm, optionally 0.25 to 0.9 mm, optionally 0.6 mm.

Clause A15. The powder spraying system of any preceding clause, wherein the nozzle outlet is located in a first end face of the nozzle body and the powder inlet is located in an opposite, second end face of the nozzle body.

Clause A16. The powder spraying system of any preceding clause, wherein the first conduit is a straight conduit between the powder inlet and the powder outlet.

Clause A17. The powder spraying system of any preceding clause, wherein the first conduit is parallel to, and optionally coincident with, a longitudinal axis of the nozzle body.

Clause A18. The powder spraying system of any preceding clause, wherein the first conduit comprises a bore whose internal diameter decreases from a first diameter at the powder inlet to a second diameter at or adjacent the powder outlet.

Clause A19. The powder spraying system of any preceding clause, wherein the first conduit comprises a bore whose internal diameter smoothly decreases from a first diameter at the powder inlet to a second diameter at or adjacent the powder outlet.

Clause A20. The powder spraying system of any preceding clause, wherein the first conduit comprises a bore whose internal diameter decreases from a first diameter at the powder inlet to a second diameter at or adjacent the powder outlet exclusively via one or more tapered sections.

Clause A21. The powder spraying system of any preceding clause, wherein the nozzle body comprises one or more secondary gas outlets that are spaced from the nozzle outlet and are orientated to direct one or more secondary flows of gas to impinge on the flow of gas and dry powder exiting the nozzle outlet, the impingement being exterior the nozzle body and at a distance from, the nozzle outlet.

Clause A22. The powder spraying system of clause A21, wherein the one or more secondary gas outlets are orientated to direct the one or more secondary flows of gas such that their angle of incidence with the flow of gas and dry powder exiting the nozzle outlet is 30 to 90°, optionally 45 to 75°, optionally 60°.

Clause A23. The powder spraying system of clause A21 or clause A22, wherein the one or more secondary gas outlets comprise 2, 4, 6, 8 or more secondary gas outlets; and optionally the one or more secondary gas outlets form 1, 2, 3, 4 or more pairs of secondary gas outlets, wherein each pair of secondary gas outlets comprises two secondary gas outlets that are located on opposite sides of the nozzle outlet from each other.

Clause A24. The powder spraying system of any one of clauses A21 to A23, wherein each of the secondary gas outlets has an orifice diameter of 0.5 to 2.5 mm, optionally 1.0 to 2.5 mm.

Clause A25. The powder spraying system of any one of clauses A21 to A24, wherein the one or more secondary gas outlets are provided in one or more legs that project from a face of the nozzle body that comprises the nozzle outlet such that the one or more secondary gas outlets are located axially downstream of the nozzle outlet; and optionally the one or more secondary gas outlets are located 2 to 20 mm, optionally 8 to 15 mm axially downstream of the nozzle outlet.

Clause A26. The powder spraying system of any one of clauses A21 to A25, wherein the nozzle body comprises a third conduit, separate from the second conduit, for supplying gas to the secondary gas outlets.

Clause A27. The powder spraying system of any preceding clause, wherein the nozzle body comprises a tubular element defining at least the powder outlet of the first conduit and a cap element, wherein a clearance between the tubular element and the cap element defines the gas outlet.

Clause A28. The powder spraying system of clause A27, wherein the clearance between the tubular element and the cap element is 0.2 to 2.0 mm, optionally 0.2 to 1.0 mm, optionally 0.25 to 0.9 mm, optionally 0.6 mm.

Clause A29. The powder spraying system of any preceding clause, wherein the source of dry powder is aligned with the first conduit of the nozzle body, optionally wherein the source of dry powder is coincident with a longitudinal axis of the first conduit.

Clause A30. The powder spraying system of any preceding clause, wherein the supply conduit between the source of dry powder and the spray nozzle is straight.

Clause A31. The powder spraying system of any preceding clause, wherein the supply conduit between the source of dry powder and the spray nozzle has an internal diameter of 1 to 20 mm, optionally 5 to 10 mm.

Clause A32. The powder spraying system of any preceding clause, wherein the spray nozzle is orientated such that the nozzle outlet faces downwards and the source of dry powder is located directly above the spray nozzle.

Clause A33. The powder spraying system of any preceding clause, further comprising a clean out nozzle located within the first conduit, the clean out nozzle being connected to a supply of gas and having an outlet orientated towards the powder outlet.

Clause A34. The powder spraying system of clause A33, wherein the outlet of the clean out nozzle is located 2 to 50 mm, optionally 4 to 25 mm from the powder outlet.

Clause A35. The powder spraying system of clause A33 or clause A34, wherein the outlet of the clean out nozzle comprises 1 to 10, optionally 1 to 3 orifices; and optionally the or each orifice has an orifice diameter of 0.5 to 1.5 mm, optionally 0.5 mm.

Clause A36. The powder spraying system of any one of clauses A33 to A35, wherein the clean out nozzle is configured to produce a suction force within the first conduit to promote flow of a dry powder through the first conduit.

Clause A37. The powder spraying system of any one of clauses A33 to A36, wherein the clean out nozzle is configured to fluidise dry powder within the first conduit.

Clause A38. The powder spraying system of any one of clauses A33 to A37, wherein the clean out nozzle comprises an elongate tubular element located within the first conduit to define an annular flow space for the dry powder between an external wall of the clean out nozzle and an internal wall of the first conduit.

Clause A39. The powder spraying system of any preceding clause, wherein the source of dry powder comprises a source of a first dry powder and a source of a second dry powder, and wherein the first conduit comprises a first powder inlet in communication with the source of the first dry powder and a second powder inlet in communication with the source of the second dry powder; wherein the gas flowing through the second conduit and out of the gas outlet produces a suction force at the powder outlet to promote flow of the first dry powder and the second dry powder through the first conduit and out of the powder outlet and the nozzle outlet.

Clause A40. The powder spraying system of clause A39, wherein the first conduit comprises a first flow path for the first dry powder along at least a portion of its length and a second flow path for the second dry powder along at least a portion of its length, the first flow path and the second flow path being separate from one another; and optionally wherein the first flow path and the second flow path comprise concentrically-arranged flow paths.

Clause B1. A powder spray nozzle comprising:

i) a nozzle body having a nozzle outlet;

ii) a first conduit for dry powder; and iii) a second conduit for gas;

the first conduit extending between a powder inlet in communication with the supply conduit and a powder outlet;

the second conduit extending between a gas inlet and a gas outlet, the gas outlet being located in proximity to the powder outlet such that a gas flowing through the second conduit and out of the gas outlet produces a suction force at the powder outlet to promote flow of a dry powder through the first conduit and out of the powder outlet and the nozzle outlet;

wherein the first conduit is a straight conduit between the powder inlet and the powder outlet.

Clause B2. The powder spray nozzle of clause B1, wherein the powder outlet and the gas outlet are orientated to promote mixing of the gas with the dry powder.

Clause B3. The powder spraying nozzle of clause B1 or clause B2, wherein the powder outlet is located within the nozzle body upstream of the nozzle outlet such that an initial mixing of the gas with the dry powder occurs within an interior of the nozzle body upstream of the nozzle outlet.

Clause B4. The powder spraying nozzle of any one of clauses B1 to B3, wherein the gas outlet is located within the nozzle body upstream of the nozzle outlet.

Clause B5. The powder spraying nozzle of clause B1 or clause B2, wherein the powder outlet is located at or near the nozzle outlet of the nozzle body such that an initial mixing of the gas with the dry powder occurs outside of the nozzle body.

Clause B6. The powder spraying nozzle of clause B5, wherein the gas outlet is located at or near the nozzle outlet of the nozzle body.

Clause B7. The powder spraying nozzle of any one of clauses B1 to 37, wherein the gas outlet comprises an annular outlet that surrounds the powder outlet.

Clause B8. The powder spraying nozzle of any one of clauses B1 to B7, wherein the powder outlet is centrally located on a longitudinal axis of the nozzle body.

Clause B9. The powder spraying nozzle of any one of clauses B1 to 39, wherein the powder outlet comprises a single powder aperture.

Clause B10. The powder spraying nozzle of any one of clauses B1 to 39, wherein the powder outlet comprises a plurality of powder apertures, each powder aperture being associated with the gas outlet of the second conduit.

Clause B11. The powder spraying nozzle of clause 41, wherein at least one of the plurality of powder apertures is orientated along a longitudinal axis of the nozzle body.

Clause B12. The powder spraying nozzle of clause 41 or clause 42, wherein at least one of the plurality of powder apertures is orientated at a divergent angle to a longitudinal axis of the nozzle body.

Clause B13. The powder spraying nozzle of any one of clauses 41 to 43, wherein the or each powder aperture has an orifice diameter of 0.5 to 5.0 mm, optionally 1.0 to 2.5 mm, optionally 1.0 to 2.0 mm.

Clause B14. The powder spraying nozzle of any one of clauses 41 to 44, wherein the gas outlet comprises an annular aperture that surrounds the or each associated powder aperture.

Clause B15. The powder spraying nozzle of clause 38 or clause 45, wherein the annular aperture has a width of 0.2 to 2.0 mm, optionally 0.2 to 1.0 mm, optionally 0.25 to 0.9 mm, optionally 0.6 mm.

Clause B16. The powder spraying nozzle of any one of clauses B1 to 46, wherein the nozzle outlet is located in a first end face of the nozzle body and the powder inlet is located in an opposite, second end face of the nozzle body.

Clause B17. The powder spraying nozzle of any one of clauses B1 to 47, wherein the first conduit is a straight conduit between the powder inlet and the powder outlet.

Clause B18. The powder spraying nozzle of any one of clauses B1 to 48, wherein the first conduit is parallel to, and optionally coincident with, a longitudinal axis of the nozzle body.

Clause B19. The powder spraying nozzle of any one of clauses B1 to 49, wherein the first conduit comprises a bore whose internal diameter decreases from a first diameter at the powder inlet to a second diameter at or adjacent the powder outlet.

Clause B20. The powder spraying nozzle of any one of clauses B1 to 50, wherein the first conduit comprises a bore whose internal diameter smoothly decreases from a first diameter at the powder inlet to a second diameter at or adjacent the powder outlet.

Clause B21. The powder spraying nozzle of any one of clauses B1 to 51, wherein the first conduit comprises a bore whose internal diameter decreases from a first diameter at the powder inlet to a second diameter at or adjacent the powder outlet exclusively via one or more tapered sections.

Clause B22. The powder spraying nozzle of any one of clauses B1 to 52, wherein the nozzle body comprises one or more secondary gas outlets that are spaced from the nozzle outlet and are orientated to direct one or more secondary flows of gas to impinge on the flow of gas and dry powder exiting the nozzle outlet, the impingement being exterior the nozzle body and at a distance from, the nozzle outlet.

Clause B23. The powder spraying nozzle of clause B22, wherein the one or more secondary gas outlets are orientated to direct the one or more secondary flows of gas such that their angle of incidence with the flow of gas and dry powder exiting the nozzle outlet is 30 to 90°, optionally 45 to 75°, optionally 60°.

Clause B24. The powder spraying nozzle of clause B22 or B23, wherein the one or more secondary gas outlets comprise 2, 4, 6, 8 or more secondary gas outlets; and optionally the one or more secondary gas outlets form 1, 2, 3, 4 or more pairs of secondary gas outlets, wherein each pair of secondary gas outlets comprises two secondary gas outlets that are located on opposite sides of the nozzle outlet from each other.

Clause B25. The powder spraying nozzle of any one of clauses B22 to B24, wherein each of the secondary gas outlets has an orifice diameter of 0.5 to 2.5 mm, optionally 1.0 to 2.5 mm.

Clause B26. The powder spraying nozzle of any one of clauses B22 to B25, wherein the one or more secondary gas outlets are provided in one or more legs that project from a face of the nozzle body that comprises the nozzle outlet such that the one or more secondary gas outlets are located axially downstream of the nozzle outlet; and optionally the one or more secondary gas outlets are located 2 to 20 mm, optionally 8 to 15 mm axially downstream of the nozzle outlet.

Clause B27. The powder spraying nozzle of any one of clauses B22 to B26, wherein the nozzle body comprises a third conduit, separate from the second conduit, for supplying gas to the secondary gas outlets.

Clause B28. The powder spraying nozzle of any one of clauses B1 to B27, wherein the nozzle body comprises a tubular element defining at least the powder outlet of the first conduit and a cap element, wherein a clearance between the tubular element and the cap element defines the gas outlet.

Clause B29. The powder spraying nozzle of clause B28, wherein the clearance between the tubular element and the cap element is 0.2 to 2.0 mm, optionally 0.2 to 1.0 mm, optionally 0.25 to 0.9 mm, optionally 0.6 mm.

Clause B30. The powder spraying nozzle of any one of clauses B1 to B29, further comprising a clean out nozzle located within the first conduit, the clean out nozzle being connected to a supply of gas and having an outlet orientated towards the powder outlet.

Clause B31. The powder spraying nozzle of clause B30, wherein the outlet of the clean out nozzle is located 2 to 50 mm, optionally 4 to 25 mm from the powder outlet.

Clause B32. The powder spraying nozzle of clause B30 or clause B31, wherein the outlet of the clean out nozzle comprises 1 to 10, optionally 1 to 3 orifices; and optionally the or each orifice has an orifice diameter of 0.5 to 1.5 mm, optionally 0.5 mm.

Clause B33. The powder spraying nozzle of any one of clauses B30 to B32, wherein the clean out nozzle is configured to produce a suction force within the first conduit to promote flow of a dry powder through the first conduit.

Clause B34. The powder spraying nozzle of any one of clauses B30 to B33, wherein the clean out nozzle is configured to fluidise dry powder within the first conduit.

Clause B35. The powder spraying nozzle of any one of clauses B30 to B34, wherein the clean out nozzle comprises an elongate tubular element located within the first conduit to define an annular flow space for the dry powder between an external wall of the clean out nozzle and an internal wall of the first conduit.

Clause B36. The powder spraying nozzle of any one of clauses B1 to B35, wherein the first conduit comprises a first powder inlet and a second powder inlet.

Clause B37. The powder spraying nozzle of clause B36, wherein the first conduit comprises a first flow path for a first dry powder along at least a portion of its length and a second flow path for a second dry powder along at least a portion of its length, the first flow path and the second flow path being separate from one another; and optionally wherein the first flow path and the second flow path comprise concentrically-arranged flow paths.

Clause C1. The powder spraying system of any one of clauses A1 to A40, wherein the dry powder comprises or consists of:

a) a metal compound for forming by thermal decomposition a metal oxide;

b) a metal oxide; or c) an aerogel.

Clause C2. The powder spraying system of clause C1, wherein the metal compound comprises or consists of a metal hydroxide, a metal phosphate, a metal carbonate, a metal sulphate, a metal perchlorate, a metal iodide, a metal oxalate, a metal acetate, a metal chlorate or a mixture thereof.

Clause C3. The powder spraying system of clause C1 or C2, wherein the metal of the metal compound comprises or consists of one or more of magnesium, calcium, strontium, barium, aluminium, zirconium, manganese, lithium, iron, cobalt, nickel, copper, or gallium.

Clause C4. The powder spraying system of any one of clauses C1 to C3, wherein the metal oxide of option c) comprises one or more fumed metal oxides or fumed mixed oxides, for example fumed alumina, fumed silica, or fumed titania.

Clause C5. The powder spraying system of any one of clauses C1 to C4, wherein the aerogel comprises one or more of silica aerogel, alumina aerogel, carbon aerogel, titania aerogel, zirconia aerogel, ceria aerogel, a metal oxide aerogel and mixed oxide aerogels.

Clause C6. The powder spraying system of any one of clauses C1 to C5, wherein the dry powder has a tapped density of 1 to 3 g/cm$^3$, optionally 1.5 to 2.5 g/cm$^3$, optionally about 2 g/cm$^3$.

Clause C7. The powder spraying system of any one of clauses C1 to C6, wherein the dry powder has a d50 (by volume) less than 10 microns, optionally less than 5 microns, optionally about 2 microns.

Clause D1. Apparatus for treating a filter for filtering particulate matter from exhaust gas, the apparatus comprising the powder spraying system of any one of clauses A1 to A40 or C1 to C7 or the powder spray nozzle of any one of clauses B1 to B37.

Clause D2. The apparatus of clause D1, further comprising a filter holder for holding a filter, wherein the nozzle outlet of the powder spray nozzle is orientated to spray the dry powder towards an inlet face of the filter.

Clause D3. The apparatus of clause D2, further comprising a vacuum generator in communication with an outlet face of the filter for generating a primary flow of gas through the filter, wherein the powder spray nozzle is located upstream of the inlet face of the filter and is orientated to spray the dry powder into the primary flow of gas upstream of the inlet face of the filter.

Clause D4. The apparatus of clause D3, wherein the apparatus further comprises a flow conduit upstream of the inlet face for channelling the primary flow of gas towards the inlet face of the filter; and an adapter located between the flow conduit and the filter; the adapter being configured to adapt the shape and/or size of the flow conduit to the shape and/or size of the inlet face of the filter.

Clause D5. The apparatus of clause D4, wherein the adapter comprises a tubular body provided with an upper seal at its upper end and a lower seal at its lower end; and wherein the upper end of the adapter has a first internal diameter adapted to an internal diameter of the lower end of the flow conduit and the lower end of the adapter has a second internal diameter adapted to a diameter of the inlet face of the filter; and optionally wherein the first internal diameter of the adapter may be greater or less than the second internal diameter.

Clause E1. A method for treating a filter for filtering particulate matter from exhaust gas, the method comprising the steps of:

a) containing a dry powder in a reservoir;

b) locating a filter in a filter holder, the filter comprising a porous substrate having an inlet face and an outlet face, the inlet face and the outlet face being separated by a porous structure;

c) establishing a primary gas flow through the porous structure of the filter by applying a pressure reduction to the outlet face of the filter;

d) transferring the dry powder from the reservoir through a supply conduit and to a spray device located upstream of the inlet face of the filter; and e) spraying the dry powder, using the spray device, towards the inlet face of the filter such that the dry powder is entrained in the primary gas flow and passes through the inlet face of the filter to contact the porous structure;

wherein the dry powder is transferred through the supply conduit to the spray device by gravity and/or by a suction force generated within the spray device.

Clause E2. The method of clause E1, wherein the dry powder is transferred through the supply conduit to the spray device only by gravity and/or by a suction force generated within the spray device.

Clause E3. The method of clause E1 or clause E2, wherein the reservoir comprises a hopper directly feeding the supply conduit and the dry powder may be dosed into said hopper; optionally wherein the dosing is a gravimetric dosing of the dry powder.

Clause E4. The method of any one of clauses E1 to E3, wherein the spray device comprises a spray nozzle that is supplied with a flow of pressurised gas along a conduit that is separate from the supply conduit, the flow of pressurised gas being used in the spray nozzle to generate the suction force.

Clause E5. The method of any one of clauses E1 to E4, wherein the spray device comprises a powder spray nozzle as set out in any one of clauses B1 to B37.

The invention claimed is:

1. A powder spraying system comprising:

a) a source of dry powder;

b) a spray nozzle; and c) a supply conduit connecting the source of dry powder with the spray nozzle;

wherein the spray nozzle comprises:

i) a nozzle body having a nozzle outlet;

ii) a first conduit for dry powder; and iii) a second conduit for gas;

the first conduit extending between a powder inlet in communication with the @ supply conduit and a powder outlet;

the second conduit extending between a gas inlet and a gas outlet, the gas outlet being located in proximity to the powder outlet such that a gas flowing through the second conduit and out of the gas outlet produces a suction force at the powder outlet to promote flow of a dry powder through the first conduit and out of the powder outlet and the nozzle outlet;

the powder outlet and the gas outlet being orientated to promote mixing of the gas with the dry powder;

wherein the first conduit is a straight conduit between the powder inlet and the powder outlet;

wherein the powder outlet is located at the nozzle outlet of the nozzle body such that an initial mixing of the gas with the dry powder occurs outside of the nozzle body; and wherein the nozzle body comprises one or more secondary gas outlets that are spaced from the nozzle outlet and are orientated to direct one or more secondary flows of gas to impinge on the flow of gas and dry powder exiting the nozzle outlet, the impingement being exterior the nozzle body and at a distance from the nozzle outlet.

2. The powder spraying system of claim 1, wherein the powder outlet comprises:

a single powder aperture; or a plurality of powder apertures, each powder aperture being associated with the gas outlet of the second conduit.

3. The powder spraying system of claim 2, wherein the each powder aperture has an orifice diameter of 1.0 to 2.5 mm.

4. The powder spraying system of claim 1, wherein the nozzle outlet is located in a first end face of the nozzle body and the powder inlet is located in an opposite, second end face of the nozzle body.

5. The powder spraying system of claim 1, wherein the first conduit is parallel toa longitudinal axis of the nozzle body.

6. The powder spraying system of claim 1, wherein the first conduit comprises a bore whose internal diameter decreases from a first diameter at the powder inlet to a second diameter at or adjacent the powder outlet.

7. The powder spraying system of claim 1, wherein the first conduit comprises a bore whose internal diameter smoothly decreases from a first diameter at the powder inlet to a second diameter at or adjacent the powder outlet.

8. The powder spraying system of claim 1, wherein the first conduit comprises a bore whose internal diameter decreases from a first diameter at the powder inlet to a second diameter at or adjacent the powder outlet exclusively via one or more tapered sections.

9. The powder spraying system of claim 1, wherein the one or more secondary gas outlets are orientated to direct the one or more secondary flows of gas such that their angle of incidence with the flow of gas and dry powder exiting the nozzle outlet is 45 to 75°.

10. The powder spraying system of claim 9, wherein the one or more secondary gas outlets comprise 2, 4, 6, 8 or more secondary gas outlets; and optionally the one or more secondary gas outlets form 1, 2, 3, 4 or more pairs of secondary gas outlets, wherein each pair of secondary gas outlets comprises two secondary gas outlets that are located on opposite sides of the nozzle outlet from each other.

11. The powder spraying system of claim 9, wherein the nozzle body comprises a third conduit, separate from the second conduit, for supplying gas to the secondary gas outlets.

12. The powder spraying system of claim 1, wherein the source of dry powder is aligned with the first conduit of the nozzle body.

13. The powder spraying system of claim 1, wherein the supply conduit between the source of dry powder and the spray nozzle is straight.

14. The powder spraying system of claim 1, wherein the spray nozzle is orientated such that the nozzle outlet faces downwards and the source of dry powder is located directly above the spray nozzle.

15. The powder spraying system of claim 1, further comprising a clean out nozzle located within the first conduit, the clean out nozzle being connected to a supply of gas and having an outlet orientated towards the powder outlet.

16. A powder spray nozzle comprising:

i) a nozzle body having a nozzle outlet;

ii) a first conduit for dry powder; and iii) a second conduit for gas;

the first conduit extending between a powder inlet in communication with a supply conduit and a powder outlet;

the second conduit extending between a gas inlet and a gas outlet, the gas outlet being located in proximity to the powder outlet such that a gas flowing through the second conduit and out of the gas outlet produces a suction force at the powder outlet to promote flow of a dry powder through the first conduit and out of the powder outlet and the nozzle outlet;

wherein the first conduit is a straight conduit between the powder inlet and the powder outlet;

wherein the powder outlet is located at the nozzle outlet of the nozzle body such that an initial mixing of the gas with the dry powder occurs outside of the nozzle body; and wherein the nozzle body comprises one or more secondary gas outlets that are spaced from the nozzle outlet and are orientated to direct one or more secondary flows of gas to impinge on the flow of gas and dry powder exiting the nozzle outlet, the impingement being exterior the nozzle body and at a distance from the nozzle outlet.

17. The powder spraying nozzle of claim 16, wherein the nozzle outlet is located in a first end face of the nozzle body and the powder inlet is located in an opposite, second end face of the nozzle body.

18. Apparatus for treating a filter for filtering particulate matter from exhaust gas, the apparatus comprising the powder spraying system of claim 1 or the powder spray nozzle of claim 16.

* * * * *